(12) United States Patent
Minakami

(10) Patent No.: US 6,311,102 B1
(45) Date of Patent: Oct. 30, 2001

(54) PHYSICAL DISTRIBUTION/ TRANSPORTATION SYSTEM AND INTEGRATED PHYSICAL DISTRIBUTION SYSTEM

(75) Inventor: Hiroyuki Minakami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/284,084

(22) PCT Filed: Oct. 9, 1997

(86) PCT No.: PCT/JP97/03640

§ 371 Date: Apr. 7, 1999

§ 102(e) Date: Apr. 7, 1999

(87) PCT Pub. No.: WO98/15883

PCT Pub. Date: Apr. 16, 1998

(30) Foreign Application Priority Data

Oct. 9, 1996 (JP) ................................................ 8-268874

(51) Int. Cl.⁷ ..................................................... G06F 07/00
(52) U.S. Cl. .......................... 700/217; 700/229; 700/225; 700/215
(58) Field of Search ..................................... 700/217, 229, 700/225, 215; 340/825.36, 35; 705/8, 9, 26

(56) References Cited

U.S. PATENT DOCUMENTS

| Re. 30,492 | * | 1/1981 | Blakeslee | 180/168 |
|---|---|---|---|---|
| 3,631,993 | * | 1/1972 | Young | 214/16.4 |
| 3,700,128 | * | 10/1972 | Noble et al. | 214/40 |
| 3,952,891 | * | 4/1976 | Terayama et al. | 214/152 |
| 4,093,084 | | 6/1978 | Ringer . | |
| 4,827,423 | * | 5/1989 | Beasley et al. | 364/468 |
| 4,873,219 | * | 10/1989 | Brickner et al. | 414/792.9 |
| 5,117,096 | * | 5/1992 | Baur et al. | 235/375 |
| 5,465,207 | * | 11/1995 | Boatwright et al. | 364/424.01 |

(List continued on next page.)

FOREIGN PATENT DOCUMENTS

| 2665871 | 2/1992 | (FR) . | |
|---|---|---|---|
| 50-508 | 1/1975 | (JP) . | |
| 58-48379 | 10/1983 | (JP) . | |
| 5-270611 | * 10/1993 | (JP) | B65G/01/00 |
| 6-255799 | 9/1994 | (JP) . | |
| 7-98741 | 4/1995 | (JP) . | |
| 7291424 | 11/1995 | (JP) . | |
| 8225107 | 9/1996 | (JP) . | |
| 8225108 | 9/1996 | (JP) . | |

OTHER PUBLICATIONS

Motoyuki Minakami, The Shuttle Highway System: A New Direction for System Architecture of the AHX, "Steps Forward" Proceedings of the Second World Congress on Intelligent Transport Systems, vol. V, pp. 2203–2212, 1995.

Primary Examiner—Christopher P. Ellis
Assistant Examiner—Michael E. Butler
(74) Attorney, Agent, or Firm—Wenderoth, Lind & Ponack, L.L.P.

(57) ABSTRACT

A physical distribution/transportation system comprises a plurality of nodes (2) for collecting cargoes from shipment parties and discharging cargoes to delivery destinations. A dedicated traveling line (4) connects the plurality of nodes (2). Pallet vehicles (6) travel between the nodes (2) along the dedicated traveling line, and a travel controlling system (22) controls operation of the pallet vehicles. Between the nodes (2) and users are utilized ordinary vehicles which travel on ordinary roads (18). The physical distribution/transportation system is constituted by a combination of the dedicated traveling line (4) and ordinary traveling lines, which are the ordinary roads (18). Further, an integrated physical distribution system includes such a physical distribution/transportation system.

15 Claims, 22 Drawing Sheets

U.S. PATENT DOCUMENTS

| | | |
|---|---|---|
| 5,501,563 | 3/1996 | Grathoff . |
| 5,505,585 * | 4/1996 | Hubbard ................................ 414/786 |
| 5,568,393 * | 10/1996 | Ando et al. ..................... 364/478.02 |
| 5,577,597 * | 11/1996 | Kakida et al. .................... 198/465.1 |
| 5,682,139 * | 10/1997 | Pradeep et al. ...................... 340/539 |
| 5,691,980 * | 11/1997 | Welles, II et al. ................... 370/316 |
| 5,712,789 * | 1/1998 | Radican ......................... 364/478.14 |
| 5,751,245 * | 5/1998 | Janky et al. ......................... 342/357 |
| 5,758,313 * | 5/1998 | Shah et al. .......................... 701/208 |
| 5,774,876 * | 6/1998 | Woolley et al. ....................... 705/28 |
| 5,780,826 * | 7/1998 | Hareyama et al. .................. 235/385 |
| 5,802,492 * | 9/1998 | De Lorme et al. .................. 701/200 |
| 5,804,810 * | 9/1998 | Woolley et al. ..................... 235/492 |
| 5,884,216 * | 3/1999 | Shah et al. ........................... 701/207 |
| 5,892,441 * | 4/1999 | Woolley et al. ..................... 340/539 |
| 5,922,040 * | 7/1999 | Prabhakaran ........................ 701/117 |
| 5,933,354 * | 8/1999 | Shimada et al. ................ 364/478.16 |

\* cited by examiner

PHYSICAL DISTRIBUTION/ TRANSPORTATION SYSTEM AND INTEGRATED PHYSICAL DISTRIBUTION SYSTEM

BACKGROUND OF THE INVENTION

The present invention relates to a physical distribution/ transportation system using an autonomous pallet vehicle and an integrated physical distribution system including the physical distribution/transportation system, a sales system, a manufacturing system and a material supply system.

There has been proposed a shuttle highway system as a transportation system using autonomous pallet vehicles ("The Shuttle Highway System" Proceeding Of The Second World Congress on Intelligent Transport System Vol. Vpp 2203–2212, 1995). In the shuttle highway system, there are arranged a plurality of interchanges, which are connected to each other via dedicated transportation lines, on which a dedicated autonomous pallet vehicle travels. Gateways from and to the interchanges are respectively connected to ordinary roads. A vehicle from an ordinary road enters the interchange from the gateway thereto and is loaded onto a pallet vehicle at the interchange. The pallet vehicle is utilized between that interchange and a destination interchange, and the pallet vehicle travels at high speed along the transportation line. At the destination interchange, the vehicle is unloaded from the pallet vehicle and is returned to an ordinary road from the gateway from the interchange and the vehicle travels to a destination on the ordinary road. In such a system, since the high-speed pallet vehicle is utilized between the interchanges, an advantage of reduced movement time in moving by a vehicle is obtained.

The above-described system for transporting vehicles is effective in transportation of vehicles. Although such a high speed transportation system has been requested not only in the field of vehicle transportation but also in the field of physical distribution systems for delivering cargoes, it is difficult to apply the shuttle system as it is to a physical distribution system.

It is an object of the present invention to provide a novel physical distribution/transportation system utilizing an autonomous pallet vehicle.

It is another object of the invention to provide a novel integrated physical distribution system including the fields of sales, manufacturing and physical distribution/ transportation.

SUMMARY OF THE INVENTION

The present invention provides a physical distribution/ transportation system comprising a plurality of nodes for collecting cargoes delivered from shipment parties and cargoes to be delivered to delivery destinations; a dedicated traveling line for connecting the plurality of nodes; pallet vehicles which travel between the plurality of nodes along the dedicated traveling line; and a travel controlling system for controlling operation of the pallet vehicles between the plurality of nodes, the travel controlling system controlling operation of the pallet vehicles based on transporting party information and transported destination information regarding the delivery cargoes.

According to the physical distribution/transportation system of the invention, since the cargoes delivered from shipment parties and the cargoes to be delivered to delivery destinations are collected at the nodes and transported between the plurality of nodes by the pallet vehicles which travel under control of the travel controlling system, the physical distribution/transportation system centering on operation of the pallet vehicles can be constructed. Accordingly, high-speed and accurate transportation of cargoes is made feasible by managing the operation of the pallet vehicles with the result that transportation time of cargoes can be reduced.

Further, the invention is characterized in that the plurality of nodes are respectively arranged so as to correspond to predetermined areas, and when a cargo is delivered from a shipment party of a first specific are to a delivery destination of a second specific area, the cargo is transported from the shipment party to a first specific node corresponding to the first specific area by an ordinary vehicle, transported by the pallet vehicle between the first specific node and a second specific node corresponding to the second specific area, and delivered by the ordinary vehicle from the second specific node to the delivery destination.

According to the physical distribution/transportation system of the invention, the cargo delivered from the shipment party is collected at the first specific node near the shipment party by the ordinary vehicle, and is transported by the pallet vehicle between the first specific node and the second specific node near the delivery destination. Further, the cargo is further delivered by the ordinary vehicle between the second specific node and the delivery destination. Accordingly, highly efficient transportation is made feasible by a combination of the pallet vehicle which travels on the dedicated traveling line and the ordinary vehicle.

Further, the invention is characterized in that the node is connected with a dedicated traveling line for the pallet vehicle and an ordinary traveling line for the ordinary vehicle, and the dedicated traveling line is arranged on one side of the node, while the ordinary traveling line is arranged on the other side of the node opposed to the one side.

According to the physical distribution/transportation system of the invention, since the dedicated traveling line is arranged on one side of the node and the ordinary traveling line is arranged on the other side of the node so as to be nearly parallel to the dedicated traveling line and move in a direction opposite to that of the dedicated traveling line, the pallet vehicle and the ordinary vehicle move smoothly at the node.

Further, the invention is characterized in that the pallet vehicle comprises a loading apparatus for loading and securing a cargo, and a traveling device for autonomously conveying the pallet via a vehicle control system along the dedicated traveling line. The pallet vehicle is controlled to travel on the basis of information on the cargoes to be transported.

According to the physical distribution/transportation system of the invention, the pallet vehicle is loaded with the cargo to be secured thereto by the loading apparatus and autonomously travels via the traveling device on the basis of information on the cargoes to be transported, and accordingly the cargoes are delivered to desired nodes by the pallet vehicle with reliability.

Further, the invention is characterized in that the specific node comprises a first unloading dock for unloading cargoes transported by the pallet vehicles, a first loading dock for loading cargoes onto the pallet vehicles, a second unloading dock for loading cargoes transported by the ordinary vehicles, a second loading dock for loading cargoes onto the ordinary vehicles, a first transfer apparatus for transferring cargoes unloaded at the first unloading dock to the second loading dock, and a second transfer apparatus for transferring cargoes unloaded at the second unloading dock to the first loading dock. The first unloading dock, the first transfer apparatus and the second loading dock are arranged on a side of one end of the specific node in a direction perpendicular to the dedicated traveling line and the ordinary traveling line, and the second unloading dock, the second transfer apparatus and the first loading dock are arranged on a side of the other end of the specific node in the direction perpendicular to the dedicated traveling line and the ordinary traveling line.

According to the physical distribution/transportation system of the invention, since the first unloading dock for the pallet vehicles and the second loading dock for the ordinary vehicles are arranged on the side of the one end portion of the node, and the second unloading dock for the ordinary vehicles and the first loading dock for the pallet vehicles are arranged on the side of the other end portion of the node, cargoes delivered from the shipment parties and cargoes to be delivered to delivery destinations are smoothly transferred at the node with the result that these cargoes are prevented from being mixed.

Further, the invention is characterized in that a first storage yard for temporarily stocking cargoes unloaded at the first unloading dock is provided in relation to the first transfer apparatus, a second storage yard for temporarily stocking cargoes unloaded at the second unloading dock is provided in relation to the second transfer apparatus, a vacant pallet vehicle storage yard for stocking the pallet vehicles not loaded with cargoes is provided between the first unloading dock and the first loading dock, and a vacant vehicle parking yard for parking the ordinary vehicles not loaded with cargoes is provided between the second unloading dock and the second loading dock.

According to the physical distribution/transportation system of the invention, since the first storage yard for storing cargoes transported by the pallet vehicles and the second storage yard for storing cargoes collected by the ordinary vehicles are independently arranged, these cargoes are not mixed together at the storage yards. Further, since the vacant pallet vehicle storage yard and the vacant vehicle parking yard are provided, the vacant pallet vehicles and the vacant ordinary vehicles can temporarily be stopped.

Further, the invention is characterized in that the plurality of nodes include a harbor node for unloading cargoes from a ship and/or for loading cargoes onto a ship. When a cargo unloaded from the ship at the harbor node is delivered to a delivery destination, the cargo is transported by the pallet vehicle from the harbor node to a specific node corresponding to the delivery destination, and when a cargo to be loaded onto the ship at the harbor node is collected from a shipment party, the cargo is transported by the pallet vehicle from a specific node corresponding to the shipment party, to the harbor node.

According to the physical distribution/transportation system of the invention, since the harbor node is included as one of the plurality of nodes, cargoes unloaded from the ship can be loaded onto the pallet vehicles via the harbor node and cargoes of the pallet vehicles can be loaded to the ship via the harbor node.

Further, the invention is characterized in that the harbor node is provided with a crane for unloading cargoes transported by the ship and/or for loading cargoes onto the ship, by which crane the cargoes unloaded from the ship are directly loaded onto the pallet vehicles and the cargoes to be loaded onto the ship are loaded directly from the pallet vehicles onto the ship. A low-speed-travel or temporary-stop area where the pallet vehicles travel at a low speed or temporarily stop is provided at the harbor node or in a vicinity thereof.

According to the physical distribution/transportation system of the invention, since the crane is arranged at the harbor node, cargoes from the ship can directly be loaded onto the pallet vehicles or cargoes from the pallet vehicles can directly be loaded onto the ship by the crane. Further, since the low-speed-travel or temporary-stop area is provided at the harbor node or in a vicinity thereof, checking of cargoes, customs clearance etc. can be carried out at the traveling area.

Further, the invention is characterized in that the plurality of nodes includes a pallet vehicle node for loading the pallet vehicles loaded with cargoes onto a ship and/or for unloading the pallet vehicles therefrom. The ship is provided with the dedicated traveling line to be connected to the dedicated traveling line of the pallet vehicle node, and the pallet vehicles are directly loaded onto a ship from the dedicated traveling line of the pallet vehicle node via the dedicated traveling line of the ship and are directly unloaded from the ship, from the dedicated traveling line of the ship via the dedicated traveling line of the pallet vehicle node.

According to the physical distribution/transportation system of the invention, since the dedicated traveling line for the pallet vehicles is arranged at the ship, the pallet vehicles can directly be loaded onto the ship from the dedicated traveling line of the pallet vehicle node via the dedicated traveling line of the ship and the pallet vehicles transported by the ship can directly be unloaded to the pallet vehicle node, with the result that it is not necessary to unload cargoes from the pallet vehicles in transportation between the pallet vehicle nodes by the ship.

Further, the invention is characterized in that the plurality of nodes include an airport node for unloading cargoes from an airplane and/or for loading cargoes onto an airplane. When a cargo unloaded from the airplane at the airport node is delivered to a delivery destination, the cargo is transported by the pallet vehicle from the airport node to a specific node corresponding to the delivery destination, and when a cargo loaded onto the airplane at the airport node is collected from a shipment party, the cargo is transported by the pallet vehicle from a specific node corresponding to the shipment party to the airport node.

According to the physical distribution/transportation system of the invention, since the airport node is included as one of the plurality of nodes, cargoes unloaded from the airplane can be loaded onto the pallet vehicles via the airport node, and cargoes of the pallet vehicles can be loaded onto an airplane via the airport node.

Further, the invention is characterized in that the airport node is provided with a crane for unloading cargoes transported by the airplane and/or for loading cargoes transported by the airplane and/or for loading cargoes onto the airplane, by which crane the cargoes to be unloaded from the airplane are directly loaded onto the pallet vehicles, and the cargoes to be loaded onto the airplane are loaded directly from the pallet vehicles onto the airplane. A low-speed-travel or temporary-stop area where the pallet vehicles travel at a low speed or temporarily stop is provided at the airport node or in a vicinity thereof.

According to the physical distribution/transportation system of the invention, since the airport node is provided with the crane, cargoes from the airplane can directly be loaded on the pallet vehicles or cargoes from the pallet vehicles can directly be loaded onto the airplane by the crane. Further, since the low-speed-travel or temporary-stop area is provided at the airport node or in a vicinity thereof, checking of cargoes and customs clearance can be carried out at the traveling line.

Further, the invention is characterized in that the plurality of nodes includes airport pallet vehicle node for loading the pallet vehicles loaded with cargoes onto an airplane and/or for unloading the pallet vehicles therefrom, the airplane is provided with the dedicated traveling line to be connected to a dedicated traveling line of the airport pallet vehicle node, and the pallet vehicles are directly loaded onto the airplane from the dedicated traveling line of the airport pallet vehicle node via the dedicated traveling line of the airplane and are directly unloaded from the airplane from the dedicated traveling line of the airplane via the dedicated traveling line of the airport pallet vehicle node.

According to the physical distribution/transportation system of the invention, since the dedicated traveling line for the pallet vehicles is arranged in the airplane, the pallet vehicles can directly be loaded onto the airplane from the dedicated traveling line of the airport pallet vehicle node via the dedicated traveling line of the airplane, the pallet vehicles transported by the airplane can directly be unloaded to the airport pallet vehicle node, with the result that it is not necessary to unload the loaded cargoes from the pallet vehicles in transportation between the airport pallet vehicle nodes via the airplane.

Further, the invention is characterized in that the plurality of nodes includes an offshore node provided at an offshore area remote from an inland area, the offshore node and the inland area are connected via a bridge or tunnel and the bridge or tunnel is provided with a dedicated traveling line.

According to the physical distribution/transportation system of the invention, since the plurality of nodes includes the offshore node remote from the inland area, by constituting a transportation base by the offshore node, a problem of noise or the like to households can be resolved. Further, since the offshore node and the inland area are connected via the bridge or tunnel having the dedicated traveling line, efficient transportation by the pallet vehicles is made feasible.

Further, the invention is characterized in that cargoes transported by the pallet vehicles are containers for containing a number of delivery items.

According to the physical distribution/transportation system of the invention, since the pallet vehicle is a container, efficient transportation of delivery items is made feasible.

Further, the invention is characterized in that the plurality of nodes are each provided with a reloading yard for taking out delivery items contained in a transported container to reload them to another container.

According to the physical distribution/transportation system of the invention, since the nodes are each provided with the reloading yard, delivery items in a container which have been transported or collected at the reloading yard, can be reloaded to containers to desired nodes and efficient operation of the pallet vehicles is made feasible.

Further, the invention provides an integrated physical distribution system comprising a sales system for managing sales information of sellers, a manufacturing system for managing manufacturing information of manufacturers, a material supply system for managing material information of material suppliers, a physical distribution/transportation system for delivering cargoes to the sellers, manufacturers and material suppliers, and an integrated controlling system for integrating the sales system, manufacturing system, material supply system and physical distribution/transportation system, the integrated controlling system the physical distribution/transportation system based on information from the sales system, manufacturing system and material supply system.

According to the integrated physical distribution system of the invention, since the integrated controlling system controls the physical distribution/transportation system based on information from the sales, manufacturing and material supply systems, control of a total of the system including these is made feasible.

Further, the invention is characterized in that the physical distribution/transportation system comprises a plurality of nodes arranged so as to correspond to predetermined areas, and the plurality of nodes are connected to each other via a dedicated traveling line where the pallet vehicles travel, that cargoes from sellers, manufacturers and material suppliers in a specific area and cargoes to the traders are collected and delivered to a specific node corresponding to the specific area, and that the operation of the pallet vehicles in the physical distribution/transportation system is controlled by the integrated controlling system.

According to the integrated physical distribution system of the invention, since cargoes from sellers, manufacturers and material suppliers in the specific area and cargoes to these traders are collected and delivered to the specific node corresponding to the specific area, integration of the physical distribution/transportation systems of these traders can be achieved concentrated on the nodes.

Further, the invention is characterized in that the specific node is provided with an inventory storage space for storing portions of inventories of the sellers, manufacturers and material suppliers in the specific area.

According to the integrated physical distribution system of the invention, since the inventory storage space for the sellers, manufacturers and material suppliers at the specific area is provided at the specific node corresponding to the specific area, articles stored at the specific node can be transported to desired locations via the pallet vehicle in response to a request from the integrated controlling system and reduction of transportation time period and efficient transporting can be achieved.

Further, the invention is characterized in that the integrated controlling system is provided with a virtual mode in which a flow of cargoes is virtually predicted on the basis of information from the sales system, manufacturing system, material supply system and physical distribution/transportation system, and a determination mode in which contents predicted by the virtual mode are determined in an actual system, with the contents determined by the determining mode being fed back to the system, manufacturing system, material supply system and physical distribution/transportation system, respectively.

According to the integrated, physical distribution system of the invention, since the integrated controlling system is provided with the virtual mode in which a flow of cargoes is virtually predicted, by utilizing the virtual mode, simulation of time period (time period including manufacturing system, material supply system) until requested articles are supplied, cost required for manufacturing thereof etc. can be performed with the result that the manufacture, transportation etc. of articles under optimum conditions are achieved.

BRIEF DESCRIPTION OF THE DRAWINGS

Other and further objects, features, and advantages of the invention will be more explicit from the following detailed description taken with reference to the drawings wherein.

DESCRIPTION OF THE PREFERRED EMBODIMENTS

An explanation will be given of preferred embodiments of a physical distribution/transportation system and an integrated physical distribution system according to the present invention in reference to the accompanying drawings as follows.

Figure 1:
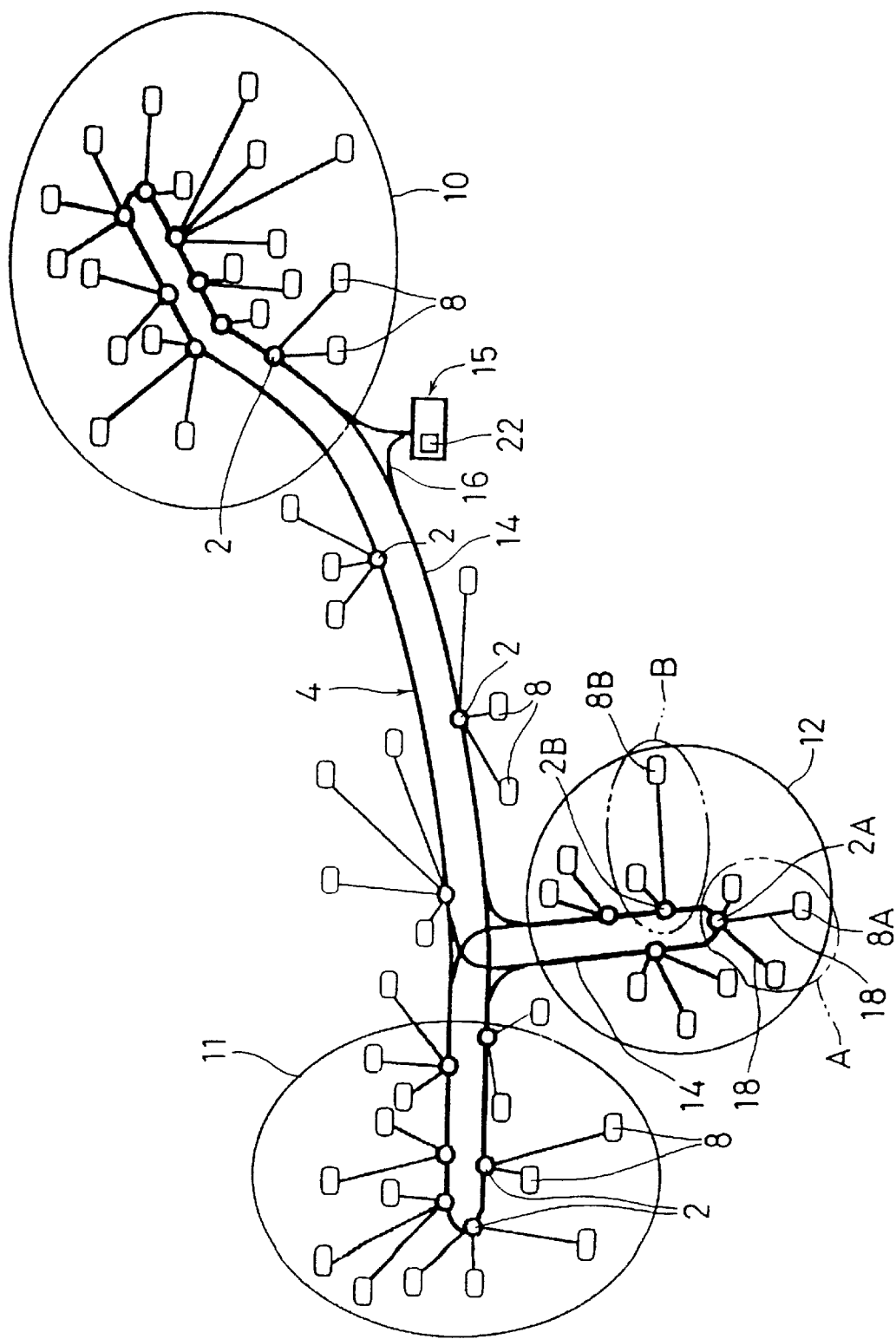
FIG. 1 is a simplified view simply showing an embodiment of a physical distribution/transportation system according to the present invention.

FIG. 1 is a view showing an outline of a mode of a physical distribution/transportation system according to the invention. In FIG. 1, the illustrated physical distribution/transportation system is provided with nodes 2 arranged so as to correspond to respective areas, a dedicated traveling line 4 for connecting the nodes 2, and pallet vehicles 6 (see FIG. 2) which travels along the dedicated traveling line 4. In FIG. 1, the respective nodes 2 are designated by circle marks and a specific structure thereof will be described later. The node 2 is arranged at an area where a trader (including an individual) utilizing the physical distribution/transportation system is present. Respective traders 8 utilizing the physical distribution/transportation system (referred to as "user") are designated by rectangular marks in FIG. 1, for example, a material supplier, a manufacturer (finished product manufacturer, part manufacturer) and a seller correspond thereto. For example, in an area where a number of the users 8 of material suppliers, manufacturers, sellers and so on are present as in industrial zones 10 and 11 and a commercial zone 12, a number of the nodes 2 are provided so as to correspond to a number of the users to thereby efficiently achieve operation of the physical distribution/transportation system. For example, a specific node 2A is selected so as to correspond to the users 8 present in a specific area A and another specific node 2B is selected so as to correspond to the other specific area B. Further, cargoes from the users 8 in the specific area A (or B) are collected at the specific node 2A (or 2B) corresponding to the area A (or B) and also cargoes to the users 8 in the specific area A (or B) are collected at the specific node 2A (or 2B) by utilizing the pallet vehicles 6 and collection and delivery of cargoes are carried out via the specific node 2A (or 2B).

The dedicated traveling line 4 is designated by bold solid lines in FIG. 1 and is arranged such that the pallet vehicle 6 can travel efficiently between the plurality of the nodes 2 and can be constructed from combinations of main lines 14 and branch lines 16 as necessary. In the embodiment of FIG. 1, lines connecting the industrial zones 10 and 11 and the commercial zone 12 are the main lines 14, meanwhile, a line connected to an operation control center 15 incorporating a travel controlling system 22, mentioned later, is a branch line 16 and the branch line 16 is extended by being branched from the main line 14. By combinations of the main lines 14 and the branch lines 16 in this way, construction of the dedicated traveling line 4 including the nodes 2 is facilitated and addition of new ones of the nodes 2 is also facilitated.

An outline of a flow of cargoes when the physical distribution/transportation system is utilized is as follows. For example, an explanation will be given of a case in which cargoes are delivered from a user 8A in the specific area A (first specific area) to a user 8B in the specific area B (second specific area). The user 8 and the node 2 corresponding to the user 8 are connected via an ordinary road 18 (which functions as an ordinary traveling line), and therefore when the cargo from the user 8 is transported, an ordinary road network where general ordinary vehicles 20 (FIG. 2), such as trucks, travel is utilized. That is, the cargo from the user 8A is transported by an ordinary vehicle 20, and the collected cargo in the specific area A is transported to the specific node 2A (first specific node) corresponding to the specific area A by utilizing the ordinary road 18.

The dedicated traveling line 4 is utilized in transportation of the cargo between the specific node 2A and the specific node 2B (second specific node) corresponding to the specific area B. The dedicated traveling line 4 is arranged quite separately from the ordinary road 18 and the ordinary vehicle 20 cannot travel on the dedicated traveling line 4. In relation to the dedicated traveling line 4, the travel controlling system 22 for controlling operation of the pallet vehicle 6 which travels thereon is provided. The travel controlling system 22 can be constituted by a mainframe computer for traveling control and the pallet vehicle 6 is operated based on instruction from the travel controlling system 22. The cargo collected at the specific node 2A is loaded onto the pallet vehicle 6 and the pallet vehicle 6 travels from the specific node 2A to the specific node 2B which is the destination, on the dedicated traveling line 4 based on instruction from the travel controlling system 22, that is, information of a transporting party and information of a transported destination.

When the pallet vehicle 6 is moved to the specific node 2B, at the specific node 2B, the cargo transported by the pallet vehicle 6 is unloaded, and thereafter the unloaded cargo is delivered to the user 8B of the delivery destination. The vacant pallet vehicle 6 unloaded of the cargo at the specific node 2B, is loaded with a new cargo and travels to the other node 2 which is a delivery destination of the loaded new cargo based on instruction from the travel controlling system 22. Delivery of the cargo between the specific node 2B and the user 8B of the delivery destination is carried out by the ordinary vehicle 20 traveling on the ordinary road 18 (which functions as an ordinary traveling line) and transportation of cargoes is carried out in this way.

In such a physical distribution/transportation system, since the transportation is carried out by utilizing the dedicated traveling line 4 between the respective nodes 2 and utilizing the ordinary road 18 between the user 8 and the node 2 corresponding to the user 8, efficient transportation of cargoes is made feasible by combinations of the dedicated traveling lines 4 for connecting between the respective nodes 2 and the ordinary roads 18. Further, since only the pallet vehicles 6 can travel on the dedicated traveling line 4, efficient operation by the traveling controlling system 22 is made feasible. In addition thereto, since traveling is feasible at high speed, time required for transporting cargoes can be reduced.

Figure 2:
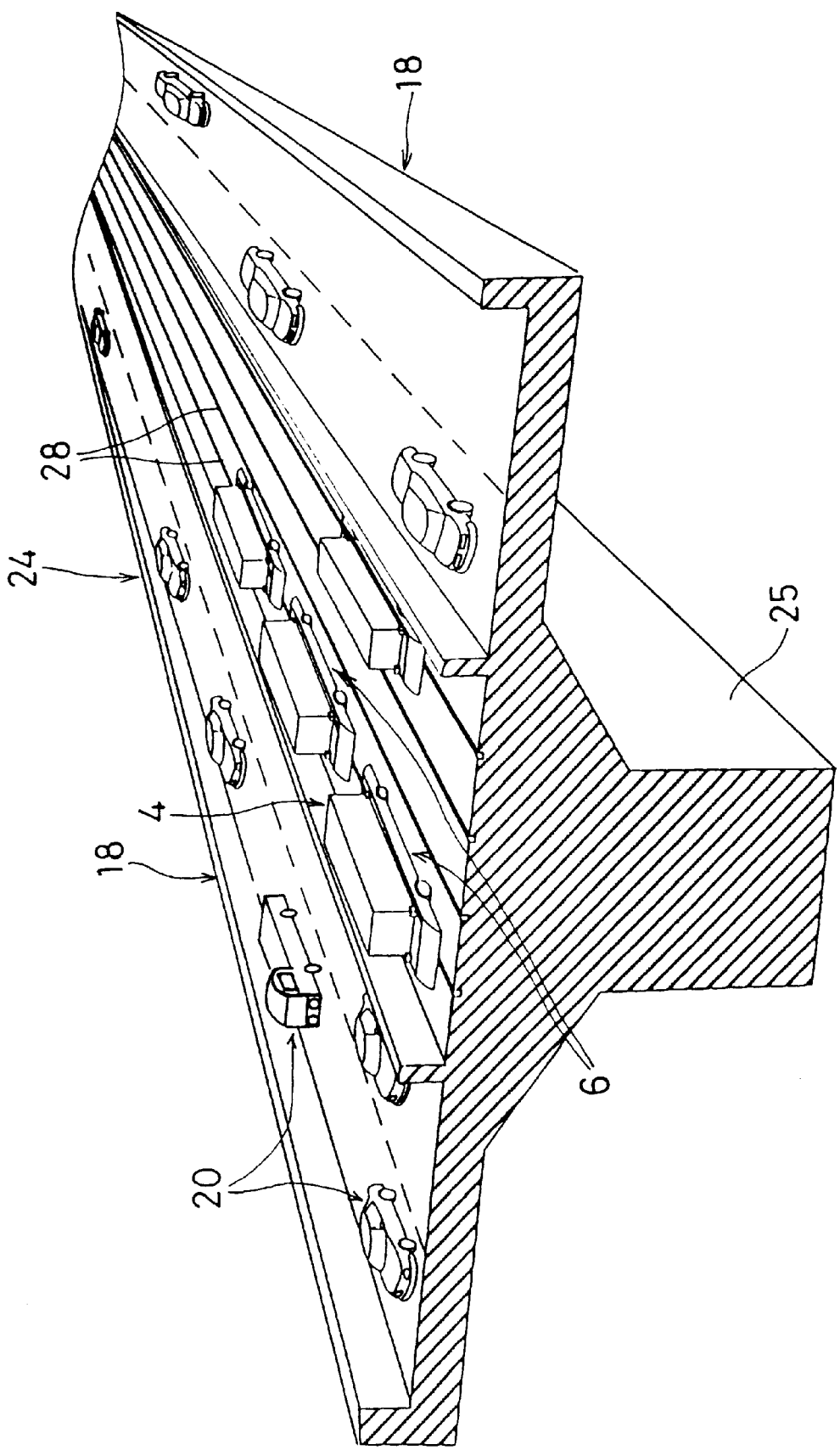
FIG. 2 is a perspective view simply showing a dedicated traveling line, pallet vehicles and the like in the physical distribution/transportation system of FIG. 1.

FIG. 2 shows a portion of a deck-type composite line 24 in which the dedicated traveling line 4 is arranged as an annex to the ordinary roads 18 (ordinary traveling line). The deck-type composite line 24 is provided with a support leg portion 25, and the dedicated traveling line 4 and the ordinary roads 18 are integrally arranged at an upper end portion of the support leg portion 25. The dedicated traveling line 4 is provided with a line main body 26 extending in the traveling direction of the pallet vehicle 6 and the line main body 26 is provided with four traveling ditches 28 at intervals in its width direction. The respective traveling ditches 28 are extended along the line main body 26 and the pallet vehicles 6 travel along the respective traveling ditches 28. A description will be given later of the pallet vehicle 6 and the traveling ditch 28. In the embodiment, while two of the four traveling ditches 28 (two traveling ditches 28 on the left side of FIG. 2) are lines where the pallet vehicles 6 travel to this side with respect to paper face, remaining two of the traveling ditches 28 (two traveling ditches 28 on the right side of FIG. 2) are lines where the pallet vehicles 6 travel to the other side with respect to paper face. Such a dedicated traveling line 4 is utilized in transportation of cargoes between the nodes 2. In the dedicated traveling line 4 of the embodiment, since four traveling ditches 28 are provided, a relatively large number of the pallet vehicles 6 can travel to be applicable to the nodes 2 between which a large number of cargoes are transported. Further, when a still larger number of the pallet vehicles 6 need to travel, a number of the traveling ditches 28 may be increased, meanwhile, when a large number of the pallet vehicles 6 need not to travel, the number of the traveling ditches 28 may be decreased.

In the composite line 24, the ordinary roads 18 are arranged on both sides of the dedicated traveling line 4. In FIG. 2, the ordinary road 18 arranged on the left side of the dedicated traveling line 4 is provided with two lines of traveling lanes, and the ordinary vehicles 20 such as trucks, passenger vehicles travel to this side with respect to paper face. Meanwhile, the ordinary road 18 arranged on the right side of the dedicated traveling line 4 is provided with two lines of travelling lanes, and the ordinary vehicles 20 travel to the other side with respect to paper face. Such an ordinary road 18 is utilized in delivery of cargoes between the user 8 and the node 2 corresponding to the user 8.

Although the above-described composite line 24 includes the dedicated traveling line 4 and the ordinary roads 18, to reduce a space in the width direction, the dedicated traveling line 4 may be arranged above or below the ordinary roads 18. Further, the dedicated traveling line 4 may be arranged quite separately from the ordinary roads 18. When high-speed traveling of the pallet vehicle 6 is desired, in view of safety of traveling or the like, the dedicated traveling line 4 is preferably to be arranged in an underground space, a tunnel or the like.

Next, in reference to FIG. 3, an explanation will be given of the pallet vehicle 6 and a constitution related thereto. The illustrated pallet vehicle 6 is provided with a pallet vehicle main body 30 in a rectangular shape. At a front portion of the pallet vehicle main body 30 is rotatably mounted a pair of front wheels (see FIG. 2), and at rear portion thereof is rotatably mounted a pair of rear wheels 32. The pallet vehicle main body 30 is provided with an automatic steering apparatus (not illustrated) for directing the front wheels in a predetermined direction and the pallet vehicle 6 travels along the dedicated traveling line 4, that is, the traveling ditch 28 by the automatic steering apparatus. The pallet vehicle main body 30 is mounted with an electric motor 34 for driving the pallet vehicle and by the electric motor 34, the pair of rear wheels 32 are rotated in the progressing direction (predetermined direction) and in the regressing direction (direction opposed to the predetermined direction). At a lower portion of the pallet vehicle main body 30 is provided a travel rod 36 extended downwardly. The travel rod 36 is provided with detection sensors 38 and 40 and electric terminal 42. The pallet vehicle main body 30 is further provided with a pallet vehicle controlling system 37 for autonomous travelling. A travelling instruction (including transporting party information and transported destination information) from the travel controlling system 22 is transported and supplied to the pallet vehicle controlling system 37, and the pallet vehicle controlling system 37 controls traveling of the pallet vehicle 6 based on the above-described traveling instruction.

Fixing structure for fixing a cargo (not illustrated) is provided on the upper face of the pallet vehicle main body 30, and thereby a cargo loaded onto the pallet vehicle 6 is fixed to the pallet vehicle main body 30. A cargo loaded onto the pallet vehicle 6 is preferably a container 44. The container 44 is formed in a shape of a large box and defines an accommodation space for accommodating materials, parts, products or the like inside thereof, and the accommodation space accommodates delivery items which are delivered from shipping sides to delivery destinations. By utilizing a container in transportation and delivery of cargoes in this way, loading and unloading of cargoes are facilitated and highly efficient transportation of delivery items is made feasible. Further, in order to be able to select in accordance with amounts of delivering delivery items, a plurality of kinds of the containers 44 having different sizes may be used, for example, two containers of different sizes, one of a large type for which the loading capacity of the travelling pallet vehicle 6 is one unit, and the other of a small type for which the loading capacity of the travelling pallet vehicle 6 is two units.

The respective traveling ditches 28 of the dedicated traveling line 4 have substantially the same structure, a section of which is formed in a rectangular shape and a power supply line 46 which is provided on a bottom portion thereof and extending along the traveling ditch 28. In the power supply line 46, electric current necessary for the pallet vehicle 6 to travel on the dedicated traveling line 4 is flowed, and is supplied to the pallet vehicle 6 via the power supply line 46. The side faces of the traveling ditch 28, opposed to each other are both provided with detected lines 48 and 50 extended along the traveling ditch 28. On both sides of the travelling ditch 28 are provided travelling regions where the front wheels and the rear wheels 32 of the pallet vehicle 6 travel, and travelling road portions 52 and 54 are provided so as to correspond to the travelling regions.

Figure 3:
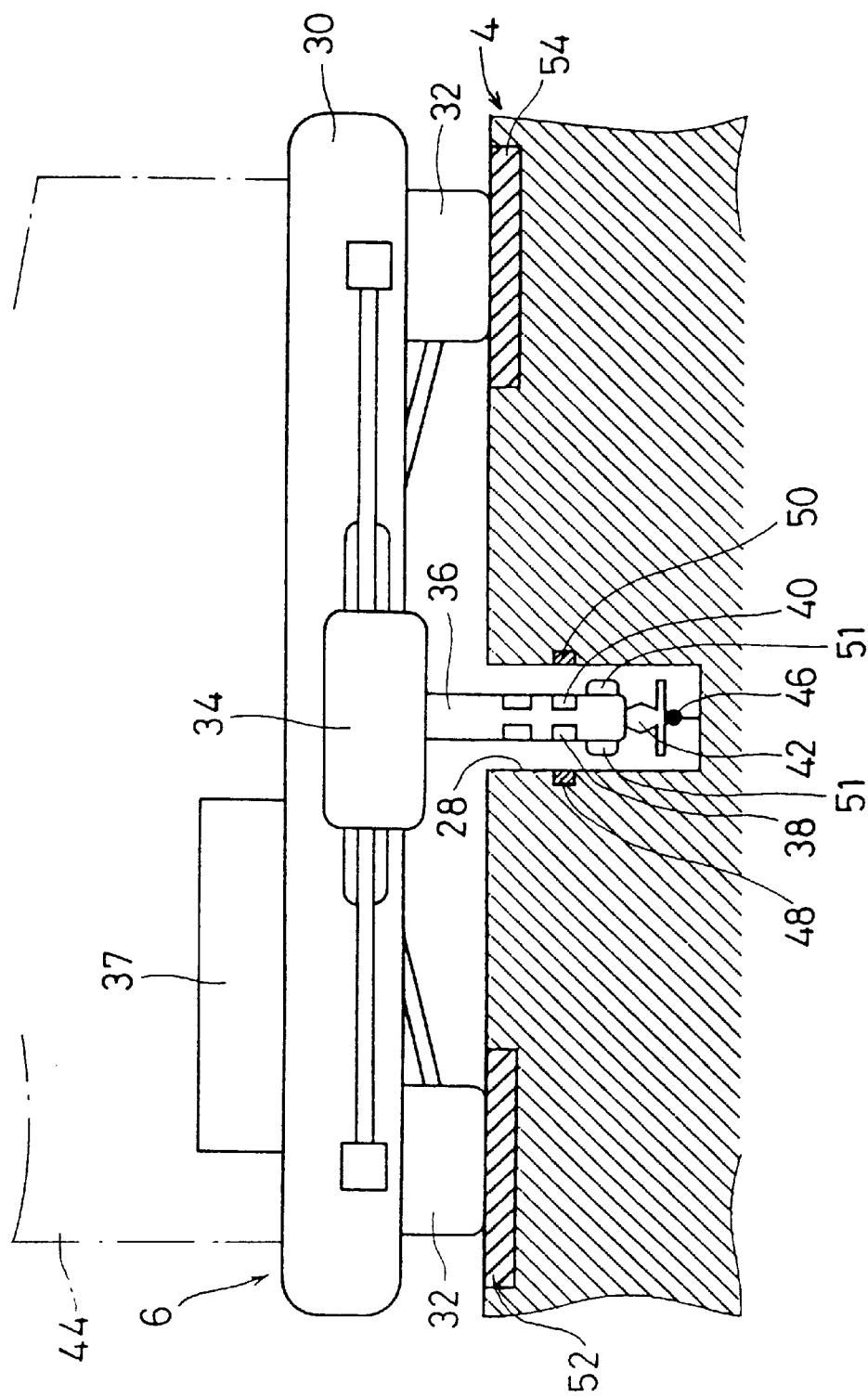
FIG. 3 is an enlarged partial sectional view showing a lower portion of the pallet vehicle and a traveling ditch in the physical distribution/transportation system of FIG. 1.

As shown in FIG. 3, the travel rod 36 of the pallet vehicle main body 30 is disposed in the traveling ditch 28. That is, the electric terminal 42 provided to further project from a front end of the travel rod 36 is brought into press contact with the power supply line 46 and is electrically connected thereto. Electric current from the power source line 46 is supplied to the pallet vehicle main body 30 via the electric terminal 42 and the electric current serves as a power source for traveling, controlling and the like of the pallet vehicle 6. Further, the detection sensors 38 and 40 provided at a substantially central portion in the axial line direction of the travel rod 36, are disposed to be opposed to the detected lines 48 and 50 of the traveling ditch 28 to detect them. The pallet vehicle controlling system 37 automatically steers the steering apparatus based on detection signals from the detection sensors 38 and 40, whereby the pallet vehicle main body 30 travels in a predetermined manner along the traveling ditch 28. Further, a pair of rollers 51 are provided on both sides of the travel rod 36, which pair of rollers 51 prevent the travel rod 36 from being brought into direct contact with sides of the traveling ditch 28.

Figure 4:
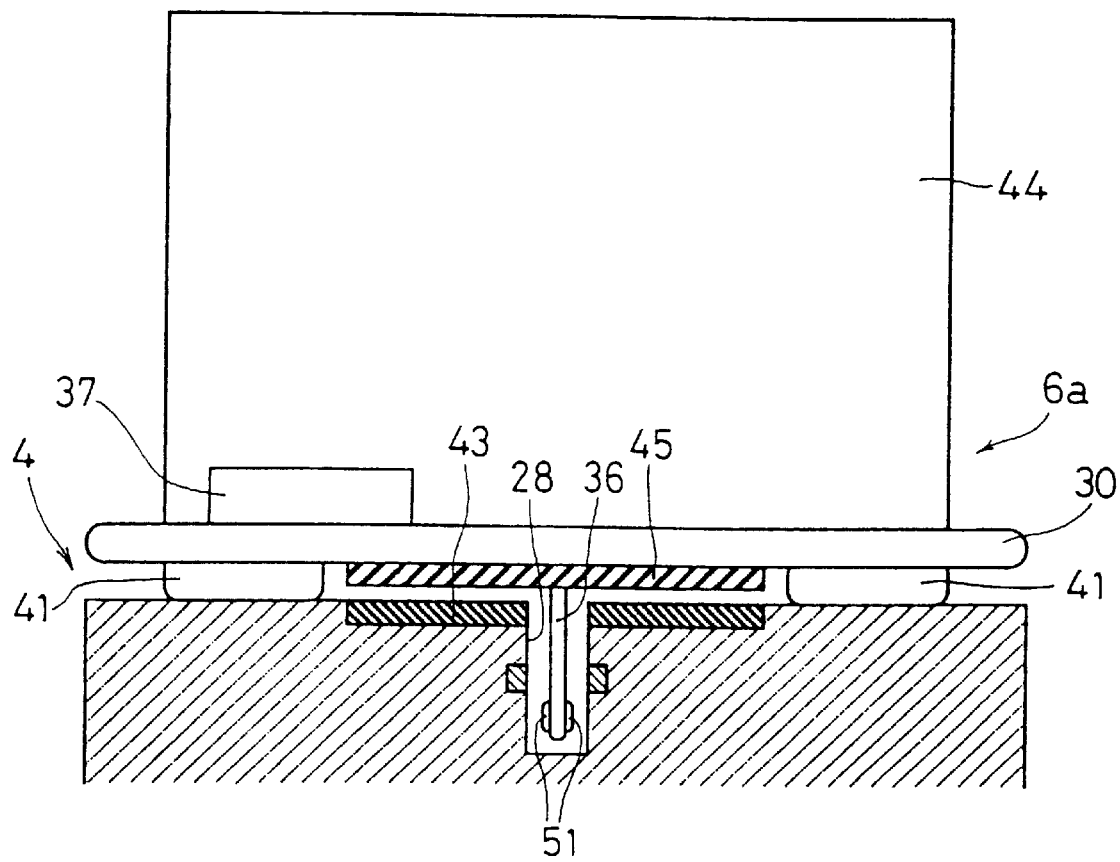
FIG. 4 is a simplified sectional view showing a pallet vehicle and a portion of a dedicated traveling line according to another embodiment.
Figure 5:
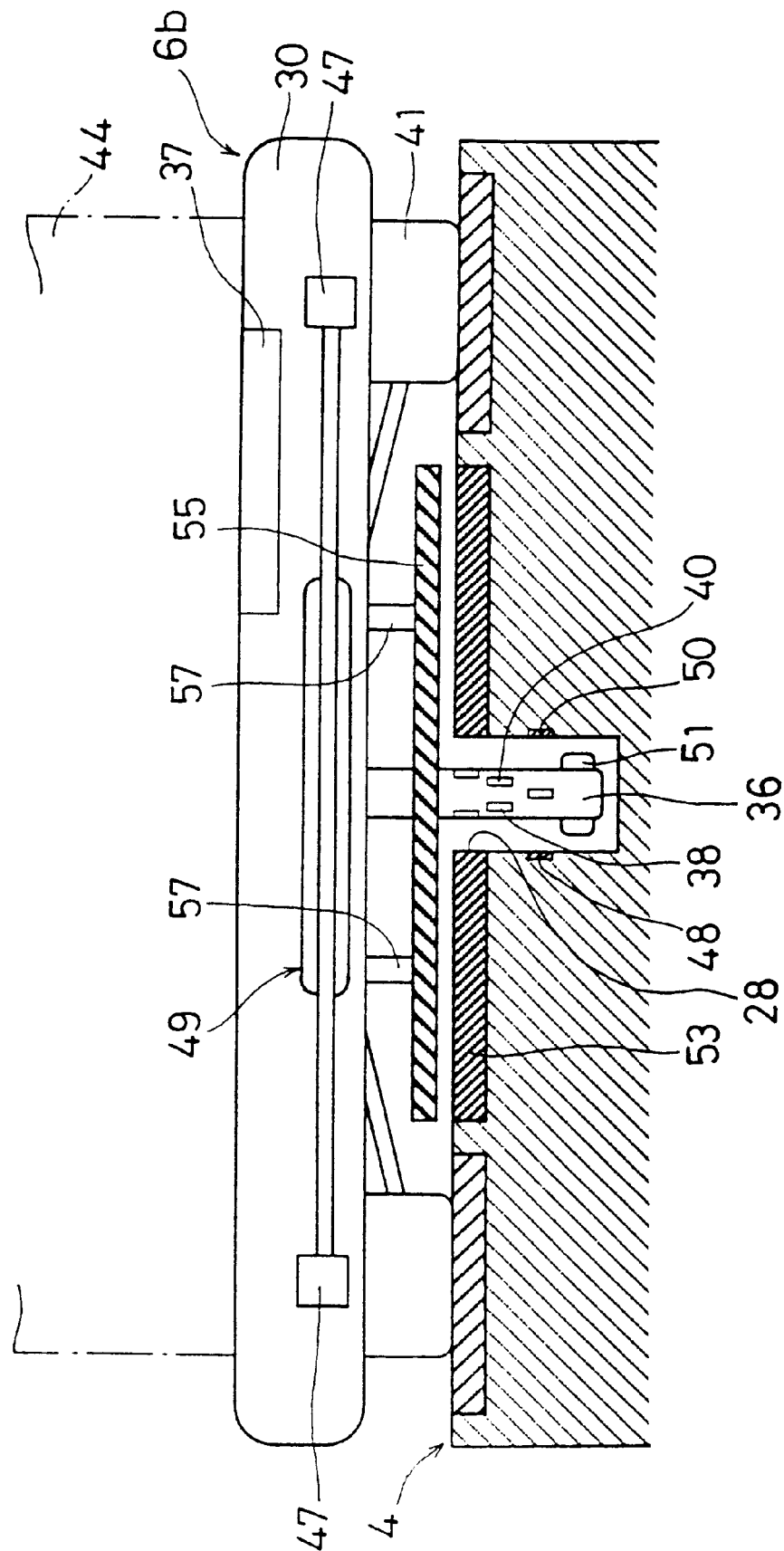
FIG. 5 is a simplified sectional view showing a pallet vehicle and a portion of a dedicated traveling line according to still another embodiment.

Although in the embodiment, as the pallet vehicle 6 traveling on the dedicated traveling line 4 used is one utilizing the electric motor 34 as shown in FIG. 3, in place thereof, pallet vehicles as shown in FIGS. 4 or 5 may be used. Further, in FIGS. 4 and 5, members substantially the same as those of the pallet vehicle of FIG. 3 are attached with the same numerals and an explanation thereof will be omitted.

In FIG. 4, an illustrated pallet vehicle 6a is provided with the pallet vehicle main body 30 onto which the container 44 is loaded, provided with a pair of front wheels 41 and a pair of rear wheels (not illustrated) in the pallet vehicle main body 30 and travels on the dedicated traveling line 4 by the front wheels 41 and the rear wheels. In this embodiment, the pallet vehicle 6a is driven to travel by an induction field. That is, induction plates 43 are arranged on both sides of the traveling ditch 28 provided in the dedicated traveling line 4. The induction plates 43 are provided substantially over an entire length of the dedicated traveling line 4 along the traveling ditch 28. Each induction plate 43 includes a plurality of induction coils (not illustrated) arranged at intervals in the line direction of the dedicated traveling line 4. Meanwhile, a reaction plate 45 is provided to be opposed to the induction plates 43 at a lower portion of the pallet vehicle main body 30. The reaction plate 45 is formed of a magnetic material. Other features of the pallet vehicle 6a is substantially the same as that shown in FIG. 3.

In the pallet vehicle 6a, when electric current is supplied to the induction plates 43 in a predetermined manner, the induction field generated in the induction plates 43 operates on the reaction plate 45. A drive traveling force is caused by the operation of the induction field and the pallet vehicle 6a travels along the dedicated traveling line 4.

FIG. 5 shows still another embodiment of a pallet vehicle. In FIG. 5, an illustrated pallet vehicle 6b is provided with the pallet vehicle main body 30 to be loaded with the container 44, which main body 30 is provided with the pair of front wheels 41 and a pair of rear wheels (not illustrated), by which the pallet vehicle travels on the dedicated traveling line 4. The pair of front wheels 41 are provided with a steering apparatus 47 for changing the progressing direction, and the respective steering apparatus 47 is connected to steering controlling system 49. Further, the detected lines 48 and 50 are arranged in the traveling ditch 28 provided for the dedicated traveling line 4. The travel rod 36 provided in the pallet vehicle main body 30 is received by the traveling ditch 28, and the detection sensors 38 and 40 of the travel rod 36 are opposed to the detected lines 48 and 50. The pallet vehicle is constituted in such a way, and therefore detection signals from the detection sensors 38 and 40 for detecting the detected lines 48 and 50 are transmitted to the steering controlling system 49. The steering controlling system 49 controls the respective steering apparatus 47 based on the detection signals from the detection sensors 38 and 40 whereby the pair of front wheels 41 are directed in a predetermined traveling direction, and the pallet vehicle 6b is moved along the dedicated traveling line 4.

In this embodiment, the pallet vehicle 6b is driven to travel by a magnetic operation. That is, linear field plates 53 are arranged on both sides of the traveling ditch 28 provided in the dedicated traveling line 4. The linear field plates 53 are provided substantially over an entire length of the dedicated traveling line 4 along the traveling ditch 28. Each field plate 53 includes a plurality of field coils (not illustrated) arranged at intervals in the line direction of the dedicated traveling line 4. Meanwhile, a reaction member 55 is provided to be opposed to the field plates 53 at a lower portion of the pallet vehicle main body 30. The reaction member 55 is formed of a permanent magnet or a magnetic material. In the embodiment, the pallet vehicle main body 30 is provided with a plurality (two pieces are shown in FIG. 5) of adjusting rods 57 and the reaction member 55 is fixed to the adjusting rods 57. By changing the length of the adjusting rods 57, an interval between the field plates 53 and the reaction member 55 can be adjusted. Further, the adjustment of the length of the adjusting rods 57 may be carried out manually or may be carried out by utilizing a cylinder mechanism of hydraulic pressure or the like. Other features of the pallet vehicle 6b is substantially the same as that shown in FIG. 3.

In such a pallet vehicle 6b, when current is supplied to the linear field plate 53 in a predetermined manner, a magnetic field is generated in the field plates 53 whereby a drive traveling force is caused by a mutual magnetic operation between the field plates 53 and the reaction member 55, and the pallet vehicle 6b travels along the dedicated traveling line 4.

Figure 6:
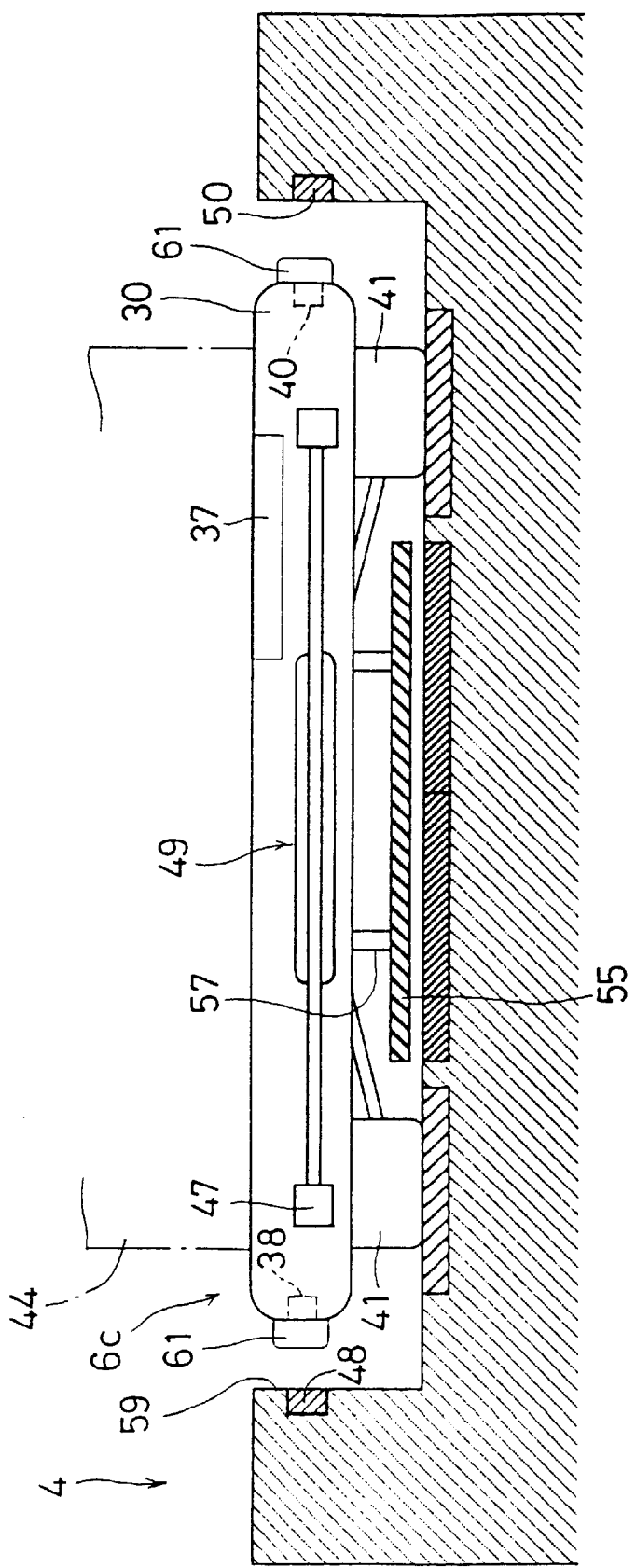
FIG. 6 is a simplified sectional view showing a pallet vehicle and a portion of a dedicated traveling line according to a further still another embodiment.

FIG. 6 shows further still another embodiment of a pallet vehicle and a constitution related thereto. In FIG. 6, an illustrated pallet vehicle 6c is constructed by a constitution basically the same as that shown in FIG. 5 except the travel rod is not provided. That is, the pallet vehicle 6c is provided with the pallet vehicle main body 30 to be loaded with the container 44, which main body 30 is provided with the pair of front wheels 41 and a pair of rear wheels (not illustrated). The pair of front wheels 41 are provided with the mechanism 47,which are each connected to the steering controlling system 49. Further, to the pallet vehicle main body 30 is attached the reaction member 55 via the adjusting rods 57. Further, the dedicated traveling line 4 is provided with linear field plates 53 each including a plurality of field coils (not illustrated).

In this embodiment, a travelling guide ditch 59 is provided on the dedicated traveling line 4 substantially over an entire length thereof. The width of the travelling guide ditch 59 is larger than the width of the pallet vehicle 6c and the pallet vehicle 6c travels in the travelling guide ditch 59. Explaining further, a plurality of rollers 61 are provided on both side portions of the pallet vehicle 6c at intervals in the forward and rearward direction of the pallet vehicle main body 30 (one roller at each side portion is shown in FIG. 6). The rollers 61 prevent the pallet vehicle main body 30 from being brought into direct contact with side walls of the travelling guide ditch 59. The side portions of the pallet vehicle main body 30 are further provided with the detection sensors 38 and 40 for detecting the detected lines 48 and 50 provided on the side walls of the travelling guide ditch 59. Detection signals from the detection sensors 38 and 40 are transmitted to the steering controlling system 49 and the steering controlling system 49 controls to operate the steering mechanism 47 based on the detection signals.

Thus, the combination of the dedicated traveling line 4 and the pallet vehicle 6c as shown in FIG. 6 may be used in place of the combination of the dedicated travelling line 4 and the pallet vehicle 6 as shown in FIGS. 2 and 3, and similar operations and effects are achieved. In this way, by utilizing an electric motor, a linear motor or the like, the problem of emission gas is resolved and high environment compatible performance is achieved.

Next, an explanation will be given of a representative embodiment of the node 2 in reference to FIG. 7. The illustrated node 2 is comprised of a comparatively large building 62 and various facilities which are equipped inside the building 62. The building 62 is of a two-tier structure, a first tier portion thereof is equipped with main facilities of the node 2 and a second tier portion mainly serves as an inventory storage space 64. The dedicated traveling line 4 where the pallet vehicles 6 travel is extended to one side (upper side in FIG. 7A) of the building 62. The dedicated traveling line 4 is provided with a main traveling line 65 via which a plurality of the nodes 2 are connected to each other. The pallet vehicle 6 travels on the main traveling line 65 from left to right in FIG. 7A as shown by an row 66. An outlet branch line 68 is branched and extended from the main traveling line 65 in front of the node 2, and inlet side dock lanes 70 which are branched in a plural number are extended from the outlet branch line 68 and the inlet side dock lanes 70 are connected to an unloading dock 72 (constituting a first unloading dock) which is provided at the left side of the building 62 in FIG. 7A. Accordingly, the pallet vehicles 6 for transporting cargoes to the node 2 (including vacant pallet vehicles 6) arrive at the unloading dock 72 from the main traveling line 65 via the outlet branch lines 68 and the predetermined inlet side dock lanes 70.

Figure 7A:
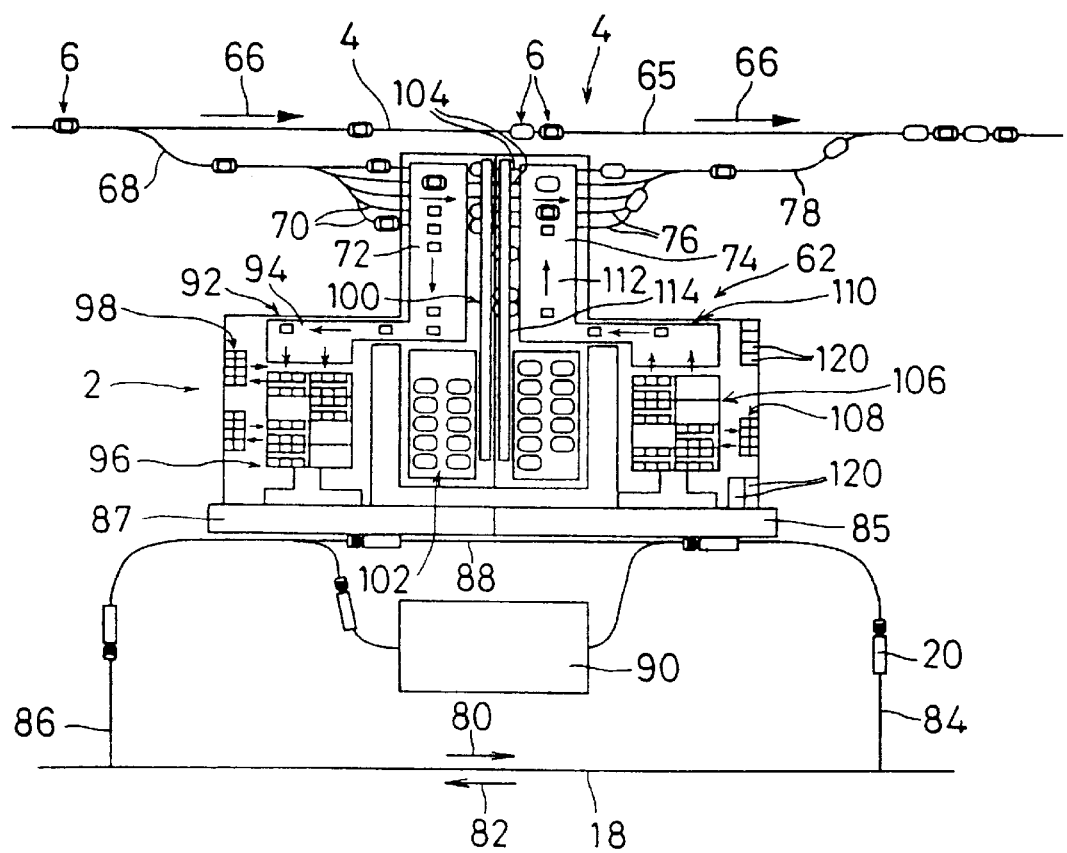
FIG. 7A is a simplified plan view showing a first layer portion of a representative example of a node in the physical distribution/transportation system of FIG. 1.

A plurality of outlet side dock lanes 76 are extended from a loading dock 74 (constituting a first loading dock) which is provided at the right side of the building 62 in FIG. 7A, the outlet side dock lanes 76 merge with an inlet branch line 78 and the inlet branch line 78 merges with the main traveling line 65. Accordingly, the pallet vehicles 6 for transporting cargoes to another node 2 (including vacant pallet vehicles 6) enter the main traveling line 65 via the outlet side dock lanes 76 and the inlet branch line 78 and travel toward the other node 2 to which cargoes are to be transported. Further, the respective inlet side dock lanes 70 and the respective outlet side dock lanes 76 are connected respectively via connection lanes 104.

The ordinary road 18 where the ordinary vehicles 20 (which may be transportation trucks or the like) travel is extended to the other side (lower side of FIG. 7A) of the building 62. The ordinary road 18 including a general road or a high-speed road) constituting the ordinary traveling line is utilized in transporting cargoes between the node 2 and the user 8 and as shown by arrows 80 and 82, the ordinary vehicles 20 reciprocally travel on the ordinary road 18. A first branch line 84 branched and extended from the ordinary road 18 is connected to an unloading dock 85 (constituting a second unloading dock) which is provided at a right portion of the building 62 in FIG. 7A. Further, a second branch line 86 branched from the ordinary road 18 is connected to a loading dock 87 (constituting a second loading dock) which is provided at a left portion of the building 62 in FIG. 7A. Further, a movement line 88 for moving the ordinary vehicle 20 is arranged between the unloading dock 85 and the loading dock 87 and a vacant vehicle parking yard 90 is provided to bypass the movement line 88.

The node is thus constituted, and when cargoes from the user 8 are transported to the node 2 via the ordinary road 18, the ordinary vehicle 20 loaded with cargoes arrives at the unloading dock 85 from the ordinary road 18 via the branch line 84. Movement of the ordinary vehicle 20 from the unloading dock 85 to the loading dock 87 is carried out via the movement line 88 or the vacant vehicle parking yard 90. That is, when the ordinary vehicle is loaded with new cargoes immediately after arrival at the node 2 and travels, the ordinary vehicle 20 moves to the loading dock 87 via the movement line 88. Meanwhile, when there is a time period to some degree until new cargoes are loaded, the ordinary vehicle 20 is parked temporarily at the vacant vehicle parking yard 90 and is thereafter moved from the parking yard 90 to the loading dock 87 (when cargoes are loaded). The ordinary vehicle 20 for delivering cargoes from the node 2 to the respective users 8, merges with the ordinary road 18 from the loading dock 87 via the second branch line 86 and travels through the ordinary road 18.

In the node 2 according to the embodiment, since the dedicated traveling line 4 where the pallet vehicles 6 travel, and the ordinary road 18 (ordinary traveling line) where the ordinary vehicles 20 travel, are arranged on sides opposed to each other by interposing the building 62, the movement of the pallet vehicles 6 and the ordinary vehicles 20 at the node 2 is made smooth. Further, the dedicated traveling line 4 and the ordinary traveling line are not intersected with each other and the constitutions of the respective traveling lines are simplified.

Flows of pallet vehicles 6 and cargoes in the node 2 are as follows. Cargoes which are unloaded at the unloading dock 72, and the pallet vehicles 6 which have transported the cargoes to the unloading dock 72 are transferred to the loading dock 87 by flowing to the left portion of the building 62 in FIG. 7A. To further explain, the cargoes flow in an outside region of the building 62 and the pallet vehicles 6 flow in an inner side region of the building 62. A transfer apparatus 92 (constituting a first transfer apparatus) is provided between the unloading dock 72 and the loading dock 87. The transfer apparatus 92 is provided with a transport conveyer 94 extending toward the loading dock 87 in a shape of an inverse L, which transport conveyor 94 transports the cargoes unloaded at the unloading dock 72, to the loading dock 87 in a direction shown by arrows. Between the transfer apparatus 92 and the loading dock 87 is provided a storage yard 96 (constituting a first storage yard) for temporarily storing the cargoes transported by the transfer apparatus 92, and a reloading yard 98 (constituting a first reloading yard) for reloading the cargoes. The storage yard 96 and the reloading yard 98 are arranged in parallel and the storage yard 96 occupies an area larger than that of the reloading yard 98.

A pallet vehicle transport apparatus 100 on the side of putting the pallet vehicle therein is placed at a substantially central portion of the building 62 in the left and right direction of FIG. 7A, that is, on inner sides of the transfer apparatus 92 and the storage yard 96. The pallet vehicle transport apparatus 100 is extended in the up and down direction of FIG. 7A and transports unused vacant ones of the pallet vehicles 6 in a downward direction from the side of the unloading dock 72. A vacant pallet vehicle storage yard 102 is provided at an end portion of the pallet vehicle transport apparatus 100. The area of the vacant pallet vehicle storage yard 102 is comparatively large and is expanded from a left portion to a right portion of the building 62. The pallet vehicles 6 are temporarily stored in the vacant pallet vehicle storage yard 102 when there is a time period after the cargoes have been transported until new cargoes are loaded.

The node is thus constituted, and when the pallet vehicles 6 arrive at the unloading dock 72, cargoes loaded onto the pallet vehicles 6 are unloaded at the unloading dock 72. The cargoes which have been unloaded from the pallet vehicles 6 are loaded onto the transport conveyor 94 of the transfer apparatus 92 and are transported to the storage yard 96 by the transport conveyor 94. Further, when the cargoes need to be stored temporarily, the cargoes are temporarily stored in the storage yard 96. Further, when the cargo is the container 44 and it is necessary to reload delivery items loaded in the container 44 in accordance with the respective users 8, the container 44 is transferred to the reloading yard 98 and the delivery items in the container 44 are reloaded at the reloading yard 98. Further, when the container 44 needs to be temporarily stored after the reloading operation, the container 44 is stored in the storage yard 96. The cargoes which have been transferred by the transfer apparatus 92 are stored directly or temporarily at the storage yard 96 (delivery items are reloaded at the reloading yard 98 as necessary), and thereafter, transferred to the loading dock 87, loaded onto the ordinary vehicles 20 at the loading dock 87 and are delivered to the respective users 8 by the ordinary vehicles 20.

The pallet vehicle 6 unloaded of the cargoes at the unloading dock 72 is moved to the loading dock 74 via the connection lane 104 connecting the unloading dock 72 and the loading dock 74, and loaded with new cargoes, as described later, at the loading dock 74. When the pallet vehicle does not travel to load cargoes immediately after unloading the cargoes, the vacant pallet vehicle 6 is transported to the vacant pallet vehicle storage yard 102 by the pallet vehicle transport apparatus 100 and is temporarily stored at the storage yard 102. Further, the vacant pallet vehicle 6 is removed from the storage yard 102 and used when needed.

Next explaining a flow of the cargoes which have been unloaded at the unloading dock 85, the unloaded cargoes are transferred to the loading dock 74 by flowing to the right portion of the building 62 in FIG. 7A. Further explaining, the cargoes flow at an outside area in the building 62 and in the embodiment, the pallet vehicle 6 coming out from the vacant pallet vehicle storage yard 102 flows at an inner side area in the building 62. Between the unloading dock 85 and the loading dock 74 are provided a storage yard 106 for temporarily storing the cargoes (constituting a second storage yard), a reloading yard 108 (constituting a second reloading yard) for reloading delivery items and a transfer apparatus 110 (constituting a second transfer apparatus) for transferring cargoes to the loading dock 74. The storage yard 106 and the reloading yard 108 are arranged in parallel between the unloading dock 85 and the transfer apparatus 110, and the storage yard 106 occupies an area larger than that of the reloading yard 108. The transfer apparatus 110 is provided with a transport conveyor 112 extended substantially in a shape of L and the transport conveyor 112 transports cargoes from the storage yard 106 (or reloading yard 108) to the loading dock 74.

At a substantially central portion of the building 62 in the left and right direction of FIG. 7A, that is, on inner sides of the transfer apparatus 110 and the storage yard 106 is placed a pallet vehicle transfer apparatus 114 on the side the pallet vehicle exists therefrom. The pallet vehicle transfer apparatus 114 is extended in the up and down direction of FIG. 7A substantially in parallel with the pallet vehicle transfer apparatus 100 on the side of receiving the pallet vehicle therein. One end portion of the pallet vehicle transfer apparatus 114 on the exit side is disposed at the vacant pallet vehicle storage yard 102, and the other end portion thereof is disposed at the loading dock 74 and transports the vacant pallet vehicle 6 to the loading dock 74.

The node is thus constituted, and when the ordinary vehicle 20 arrives at the unloading dock 85, cargoes loaded on the ordinary vehicle 20 are unloaded at the unloading dock 85. Cargoes unloaded from the ordinary vehicle 20 are transferred to the transfer apparatus 110 via the storage yard 106. When it is necessary to store cargoes temporarily, the cargoes are temporarily stored at the storage yard 106, and thereafter transferred to the transfer apparatus 110. Further, when the cargo is the container 44 and it is necessary to reload delivery items loaded on the container 44, in accordance with the respective nodes 2 of transport destinations, the cargoes are transferred to the reloading yard 108 and the delivery items in the container 44 are reloaded at the reloading yard 108. When the container 44 needs to be temporarily stored after the reloading operation, the container 44 is stored in the storage yard 106. Cargoes unloaded at the unloading dock 85 are transferred to the transfer apparatus 110 directly or after having been stored in the storage yard 106 (delivery items are reloaded at reloading yard 108 as necessary). The cargoes which have been transferred in this way are transported to the loading dock 74 in directions shown by arrows by the transport conveyer 112, loaded on the pallet vehicles 6 at the loading dock 74 and are transported to the desired ones of the nodes 2 by the pallet vehicles 6. Further, the vacant pallet vehicles 6 are transferred to the loading dock 74 from the unloading dock 72 via the connection lines 104 or from the vacant pallet vehicle storage yard 102 by the operation of the pallet vehicle transfer apparatus 114 on the exit side thereof.

Figure 7B:
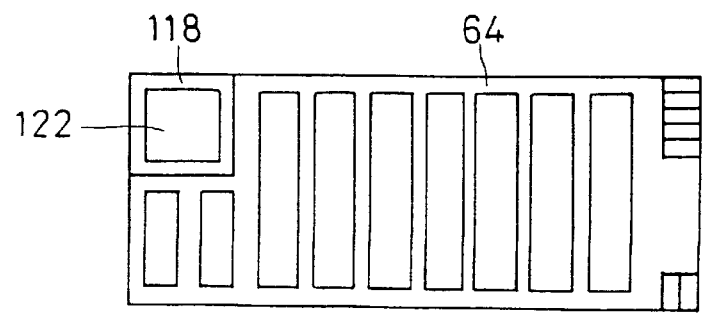
FIG. 7B is a simplified plan view showing a second layer portion thereof.

The above-described equipment of the node 2 constitutes the first tier portion of the building 62, and at the second tier portion of the building 62, as shown in FIG. 7B, are provided the inventory storage space 64 and a control and management space 118. The inventory storage space 64 is stored with portions of inventories of materials, parts, products and so on of the users 8 (material suppliers, manufacturers and sellers) corresponding to the node 2, and inventories stored in the inventory storage space 64 are delivered to the delivery destinations as necessary. The inventory storage space 64 is stored with portions of cargoes transported from the users 8 to the node 2, and the inventory storage space 64 is significantly related to the storage yard 106 and in the embodiment, the storage yard 106 and the inventory storage space 64 are connected via transport elevators 120. Therefore, when cargoes which have arrived at the unloading dock 85 are to be stored as inventories, the cargoes are transported from the storage yard 106 to the inventory storage space 64 by the transport elevators 120 and the cargoes are controlled as inventories of the inventory storage space 64. Meanwhile, when portions of the inventories are to be delivered, cargoes (delivery items) stored in the inventory storage space 64 are transported to the storage yard 106 by the transport elevators 120 and are transferred from the storage yard 106 to the loading dock 74 via the transfer apparatus 110. Further, the control and management space 118 accommodates a node controlling system 122 for controlling the above-described various facilities equipped at the node 2. The node controlling system 122 is constituted by a computer for totally controlling the node, and with regard to portions of the control, controls related to the pallet vehicles 6, for example, arrival, departure, temporal storage and so on of the pallet vehicles 6 are carried out by receiving an instruction from the travel controlling system 22 (FIG. 1) for controlling the operation of the pallet vehicles 6.

The representative node 2 is thus constituted, and the node 2 can temporarily store cargoes, reload delivery items when the cargo is the container 44 and partially store inventories of the users 8. Further, while cargoes which have been transported by the pallet vehicles 6 are transported from the unloading dock 72 to the loading dock 87 on one end portion side (left side portion in FIG. 7A) of the node 2, cargoes collected by the ordinary vehicles 20 are transported from the unloading dock 85 to the loading dock 74 on the other end portion side (right side portion in FIG. 7A) of the node 2. Accordingly, flow of cargoes is smooth, flows of cargoes are not mixed by being intersected with each other, and handling of cargoes at the node 2 is facilitated.

Figure 8:
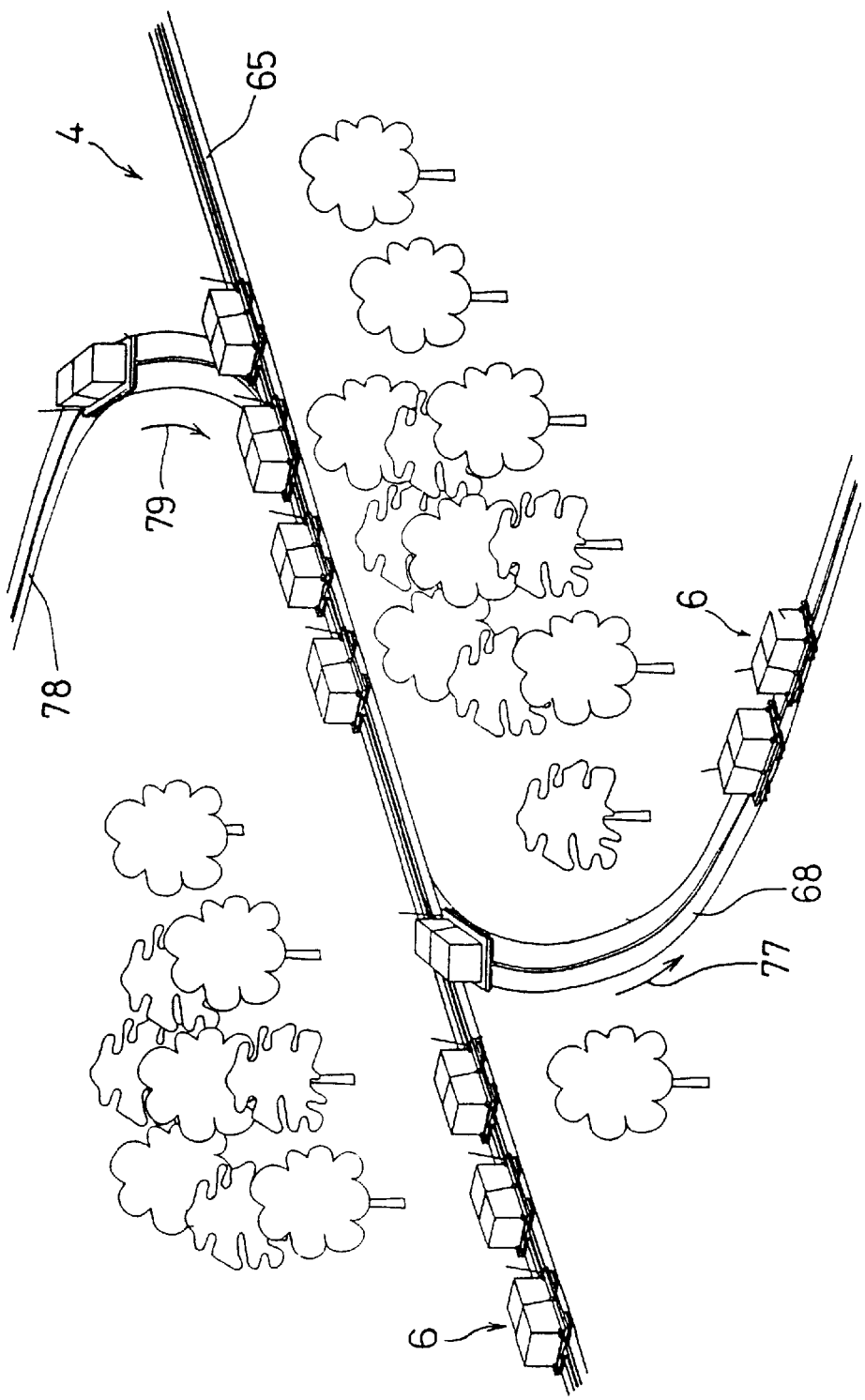
FIG. 8 is a simplified perspective view showing a diverging and a merging portion in a dedicated traveling line.

Divergence and merge from and to the main traveling line 65 are constituted as shown by, for example, FIG. 8. For example, the outlet branch line 68 is diverged from the main traveling line 65 and is connected to, for example, the inlet side dock lanes 70 of the node 2 (see FIG. 7A). Further, for example, the inlet branch line 78 extended from the outlet side dock lanes 76 of the node 2 is connected to the main traveling line 65. Therefore, the pallet vehicle 6 traveling on the main traveling line 65 is diverged from the main traveling line 65 and travels along the outlet branch line 68 to the node 2 in a direction designated by an arrow 77 by receiving instruction from the travel controlling system 22 (FIG. 1). Further, the pallet vehicle 6 traveling from the outlet side dock lane 76 in a direction designated by an arrow 79 via the inlet branch line 78, merges with the main traveling line 65 and travels by receiving an instruction from the travel controlling system 22.

Figure 9:
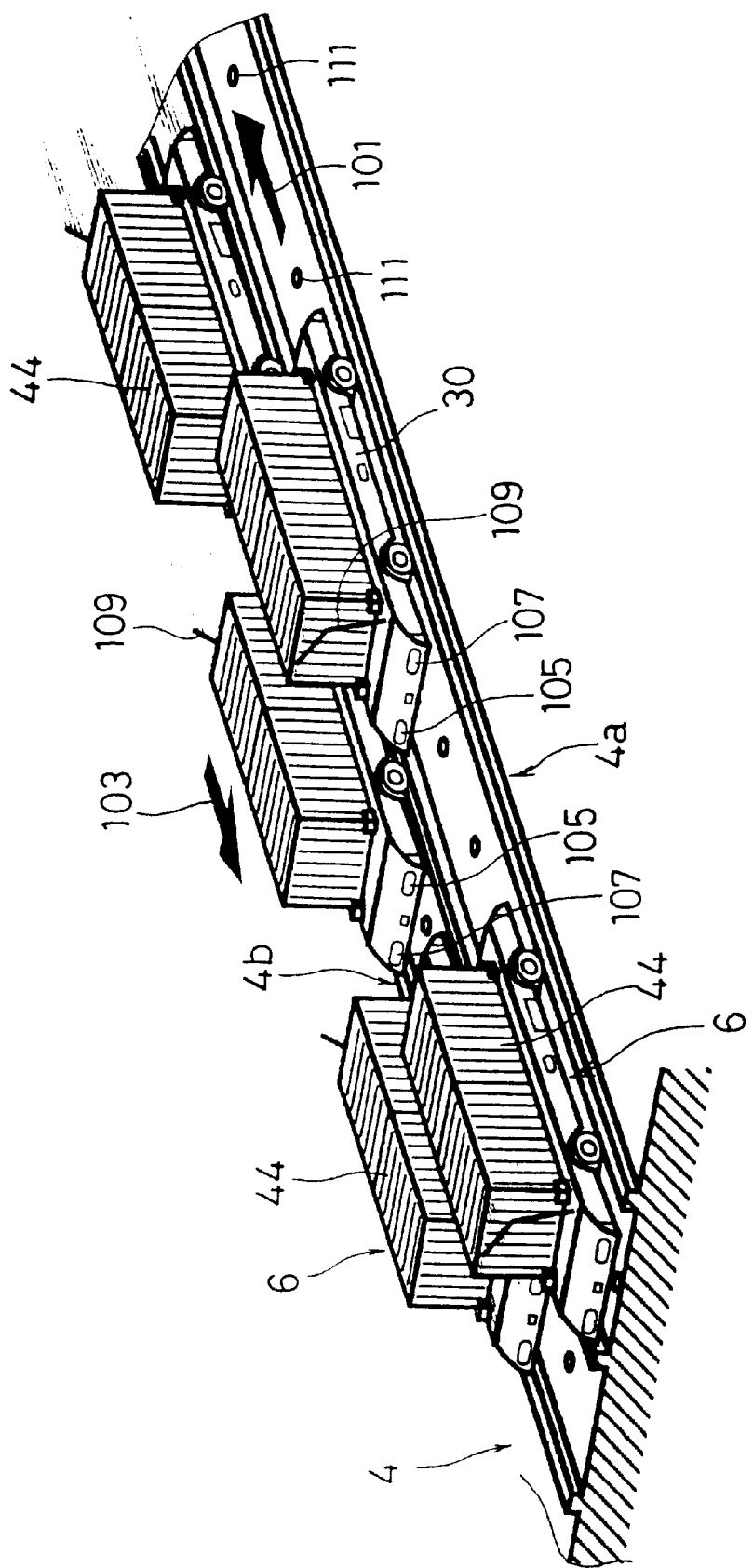
FIG. 9 is a partially perspective view showing a group of pallet vehicles moving along a dedicated traveling line.

Travelling control between the pallet vehicles 6 traveling on the dedicated traveling line 4 can be carried out, for example, as shown by FIG. 9. A traveling line 4*a* on this side of FIG. 9 is a lane on which the pallet vehicles 6 travel in the upper right direction of the drawing shown by an arrow 101, and ta traveling line 4*b* on the other side of FIG. 9 is a lane where the pallet vehicles 6 travel in the lower left direction of the drawing designated by an arrow 103. At a front end portion of each of the pallet vehicles 6 is provided a transmitting device 105 for transmitting a signal in the forward direction and receiving device 107 for receiving a reflection signal which returns by being reflected after having been transmitted from the transmitting device 105. Further, at a rear end portion of the pallet vehicle 6, similar to at the front end portion, are provided the transmitting device 105 and the receiving device 107 mentioned above. The transmitting device 105 and the receiving device 107 at the front end portion and the rear end portion of the pallet vehicle 6 are sensors for maintaining an intervehicular distance between the pallet vehicles 6 which are traveling continuously at a predetermined value. By providing such sensors, the distance between the pallet vehicles 6 is maintained at a predetermined value, collision of the pallet vehicles 6 can be prevented and the intervehicular distance is made as small as possible whereby the operation of the pallet vehicle 6 can be achieved efficiently.

The rear end portion of the pallet vehicle main body 30 of the pallet vehicle 6 is provided with a reception antenna 109 for receiving instruction from the travel controlling system 22 (FIG. 1). Instruction received by the reception antenna 109 is transmitted to the pallet vehicle controlling system 37 (FIG. 3) of the pallet vehicle 6, and the pallet vehicle controlling system 37 controls to make the pallet vehicle 6 travel based on the instruction.

Further in this embodiment, the dedicated traveling line 4 is provided with magnetic markers 111 in place of a traveling ditch. The magnetic markers 111 are constituted of a magnetized magnetic tape and are arranged at predetermined intervals along the dedicated traveling line 4. The magnetic markers 111 may be constituted of a long magnetic tape and in this case, the magnetic tape is arranged continuously along the dedicated traveling line 4. Also when the magnetic markers 111 are arranged in this way, the pallet vehicle 6 can travel autonomously along the dedicated traveling line 4.

Figure 10:
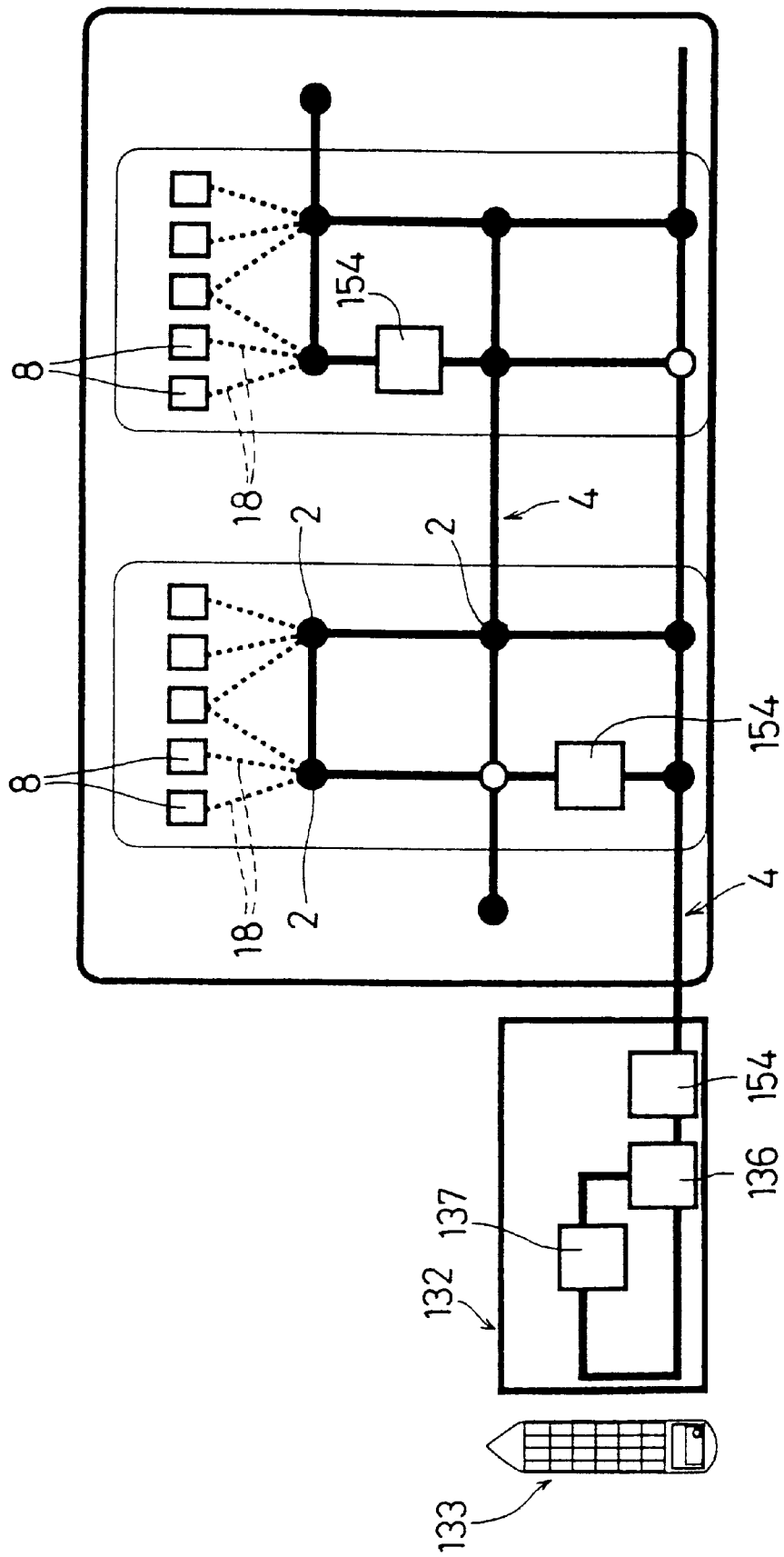
FIG. 10 is a simplified view showing a harbor node and a constitution related thereto in a physical distribution/transportation system.
Figure 11:
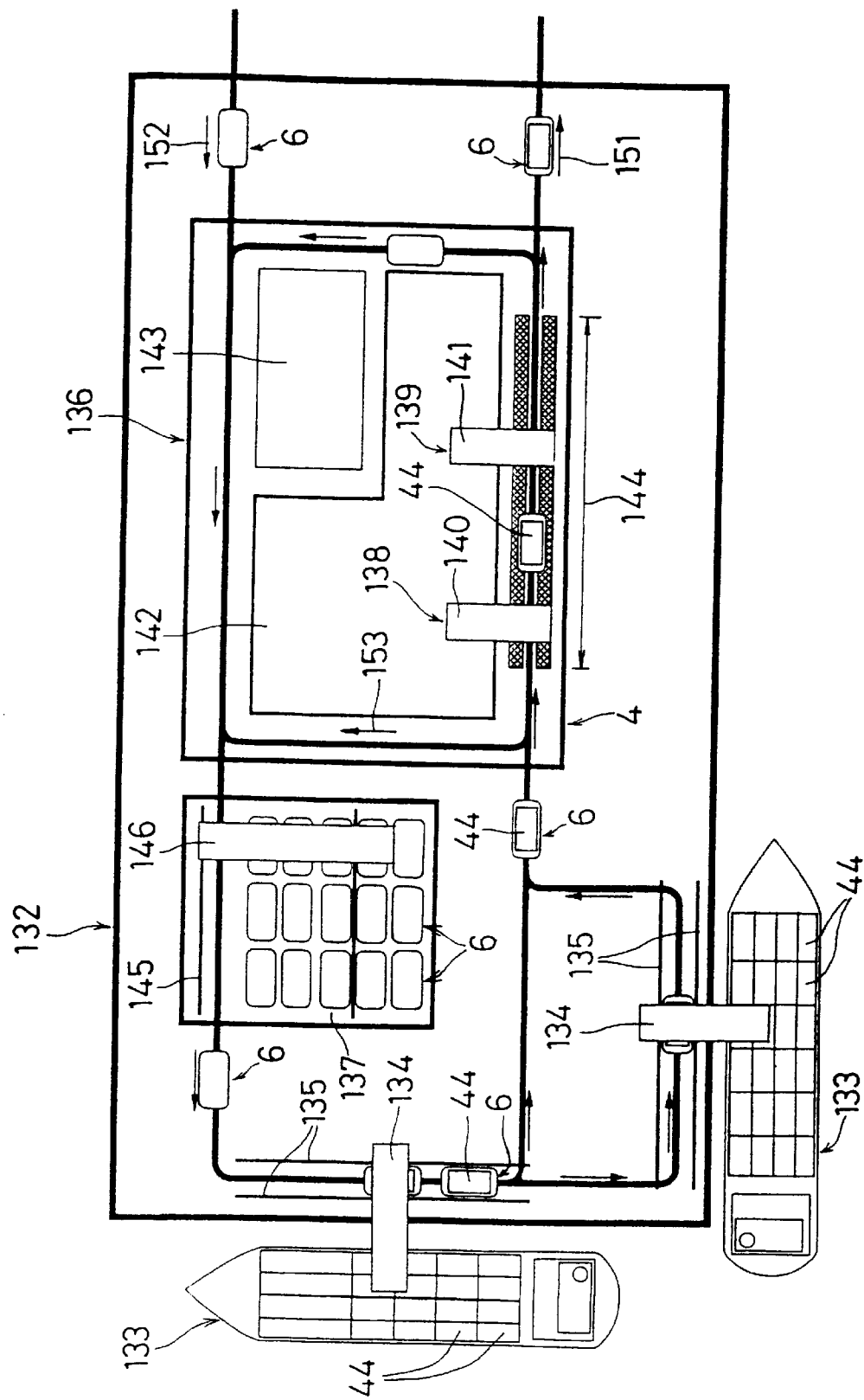
FIG. 11 is a simplified plan view specifically showing the harbor node of FIG. 10.

Although an explanation has been given of the node 2 arranged at a general area in reference to FIG. 7, a harbor node provided at a harbor can be constituted as shown in FIGS. 10 and 11, for example. In FIGS. 10 and 11, a harbor node 132 is provided at a wharf of a harbor. The harbor node 132 includes a crane 134 arranged at a dock alongside which a transport ship such as a container ship 133 arrives. The crane 134 is a large-sized crane and is arranged movably along rails 135 arranged along the dock. The crane 134 may be fixedly arranged, for example, at the dock. Since the crane 134 is provided, the containers 44 transported by a container ship 133 can directly be loaded onto the pallet vehicles 6 by the crane 134 and the containers 44 loaded onto the pallet vehicles 6 can be loaded directly on the container ship 133 by the crane 134.

The harbor node 132 is provided with a customhouse 136 and a vacant pallet vehicle storage yard 137, and the dedicated traveling line 4 is arranged through the customhouse 136, the vacant pallet vehicle storage yard 137 and the dock. The customhouse 136 is provided with a customs inlet section 138 and a customs outlet section 139 and customs clearance of cargoes transported by the container ship 133 is carried out at an area between the customs inlet section 138 and the customs outlet section 139. The customs inlet section 138 and the customs outlet section 139 are respectively provided with cranes 140 and 141, a container storage yard 142 for temporarily storing the containers 44 is provided at sides of the sections 138 and 139, and an office 143 is provided at a side of the container storage yard 142. Further, between the customs inlet section 138 and the customs outlet section 139 and at vicinities thereof is provided a low-speed-travel or temporary-stop area 144, where the pallet vehicle 6 travels at a low speed or temporarily stops.

At the vacant pallet vehicle storage yard 137 is arranged a rail 145 where a pallet vehicle transport crane 146 is movably provided. Vacant ones of the pallet vehicles 6 after having loaded the containers 44 to the container ship 133 and the pallet vehicle 6 for loading the containers 44 from the container ship 133, are temporarily stored in the yard 137. The pallet vehicle transport crane 146 is utilized in transferring vacant ones of the pallet vehicles 6 on the dedicated traveling line 4 to the vacant pallet vehicle storage yard 137 or transferring the pallet vehicles 6 stored in the vacant pallet vehicle storage yard 137 onto the dedicated traveling line 4.

In the harbor node 132, when the container ship 133 comes alongside the dock, the pallet vehicles 6 stored in the vacant pallet vehicle storage yard 137 are transferred to the dedicated traveling line 4 by the pallet vehicle transport crane 146 and travel to the predetermined dock along the dedicated traveling line 4. At the dock where the container ship 133 arrives, the containers 44 are unloaded from the container ship 133 by the crane 134 and are directly loaded onto the vacant pallet vehicles 6 as they are. In this way, the containers 44 are directly loaded onto the pallet vehicles 6, and an efficient unloading operation can be carried out.

The pallet vehicles 6 loaded with the containers 44 move along the dedicated traveling line 4, reach the customhouse 136, travel inside of the customhouse 136 and travel in a direction designated by an arrow 151 toward the nodes 2 of delivery destinations of the containers 44.

The low-speed-travel or temporary-stop area 144 is arranged in the customhouse 136, and the pallet vehicles 6 travel at a low speed or temporarily stop when they travel in the low-speed-travel or temporary-stop area 144. That is, when customs clearance of cargoes contained in the container 44 is simple, the pallet vehicle 6 travels in the low-speed-travel or temporary-stop area 144 at a low speed, and during the traveling time period, customs clearance of cargoes contained in the container 44 is carried out. Meanwhile, when the customs clearance of cargoes contained in the container 44 is complicated or in the case where there are a number of the containers 44 to be subjected to customs clearance, when the pallet vehicle 6 arrives at the customs inlet section 138, the pallet vehicle temporarily stops, the container 44 loaded onto the pallet vehicle 6 is unloaded from the pallet vehicle 6 by the crane 140 and is temporarily stored in the container storage yard 142. Further, during a time period of storing the container 44 at the container storage yard 142, customs clearance of cargoes contained in the container 44 is carried out. Further, the vacant pallet vehicle 6 after being unloaded of the container 44 travels in the low-speed-travel or temporary-stop area 144 at a low speed, and thereafter, travels to the vacant pallet vehicle storage yard 137 via the dedicated traveling line 4 and is stored in the vacant pallet vehicle storage yard 137 by the pallet vehicle transport crane 146. Further, when the customs clearance has been finished in the container storage yard 137, the vacant pallet vehicle 6 comes out from the vacant pallet vehicle storage yard 137 similar to the above-described and travels to the customs outlet section 139 of the customhouse 136 via the dedicated traveling line 4. When the pallet vehicle 6 arrives at the customs outlet section 139, the pallet vehicle 6 temporarily stops, the container 44 which has famished with customs clearance is loaded on the stationary vacant pallet vehicle 6 by the crane 141, and the pallet vehicle 6 loaded with the container 44 travels in the direction designated by the arrow 151 toward the nodes 2 of delivery directions. In this way, unloading and customs clearance of cargoes transported by the container ship 133 are carried out.

The container 44 is loaded onto the container ship 133, for example, by the following way. The pallet vehicle 6 loaded with the container 44 from the other node 2 moves to the harbor node 132 in a direction shown by an arrow 152 and travels to a dock alongside which the container ship 133 stays. When the pallet vehicle 6 travels to the dock, the pallet vehicle 6 stops temporarily and the container 44 loaded on the pallet vehicle 6 is unloaded from the pallet vehicle 6 by the crane 134, and thereafter directly loaded onto the container ship 133. Accordingly, the container 44 can easily be loaded onto the container ship 133. The pallet vehicle 6 freed of the container 44, travels to the vacant pallet vehicle storage yard 137 via the dedicated traveling line 4 in a direction designated by an arrow 153 without passing through the low-speed-travel or temporary-stop area 144 and is stored at the vacant pallet vehicle storage yard 137 by the pallet vehicle transport crane 146.

Further, although in the above-described embodiment, the customhouse 136 is provided at the harbor node 132, the customhouse 136 may be provided in a vicinity of the harbor node 132 slightly remote therefrom. Further, in place of the customhouse 136 may be provided an office for cargo confirmation for confirming a number of cargoes in the container 44 or the like, and also in this case it is preferable to provide a low speed or temporarily stop traveling area where the pallet vehicle 6 travels at a low speed or temporarily stops in the office.

Unloading and loading of the containers 44 from or to the container ship 133 are carried out as described above. Further, the pallet vehicles 6 loaded with the containers 44 are stored in a pallet vehicle storage yard 154 which is provided as necessary. The pallet vehicle storage yard 154 can be arranged, for example, adjacent to the harbor node 132 or in relation to a specific one of the nodes 2. Since the respective nodes 2 and the users 8 corresponding to the nodes 2 are connected via the ordinary roads 18, the container 44 delivered from the harbor node 132 to a desired one of the nodes 2 (third specific node), is delivered to the users 8 of delivery destinations from the node 2 by the ordinary vehicles 20 (FIG. 2).

Figure 12:
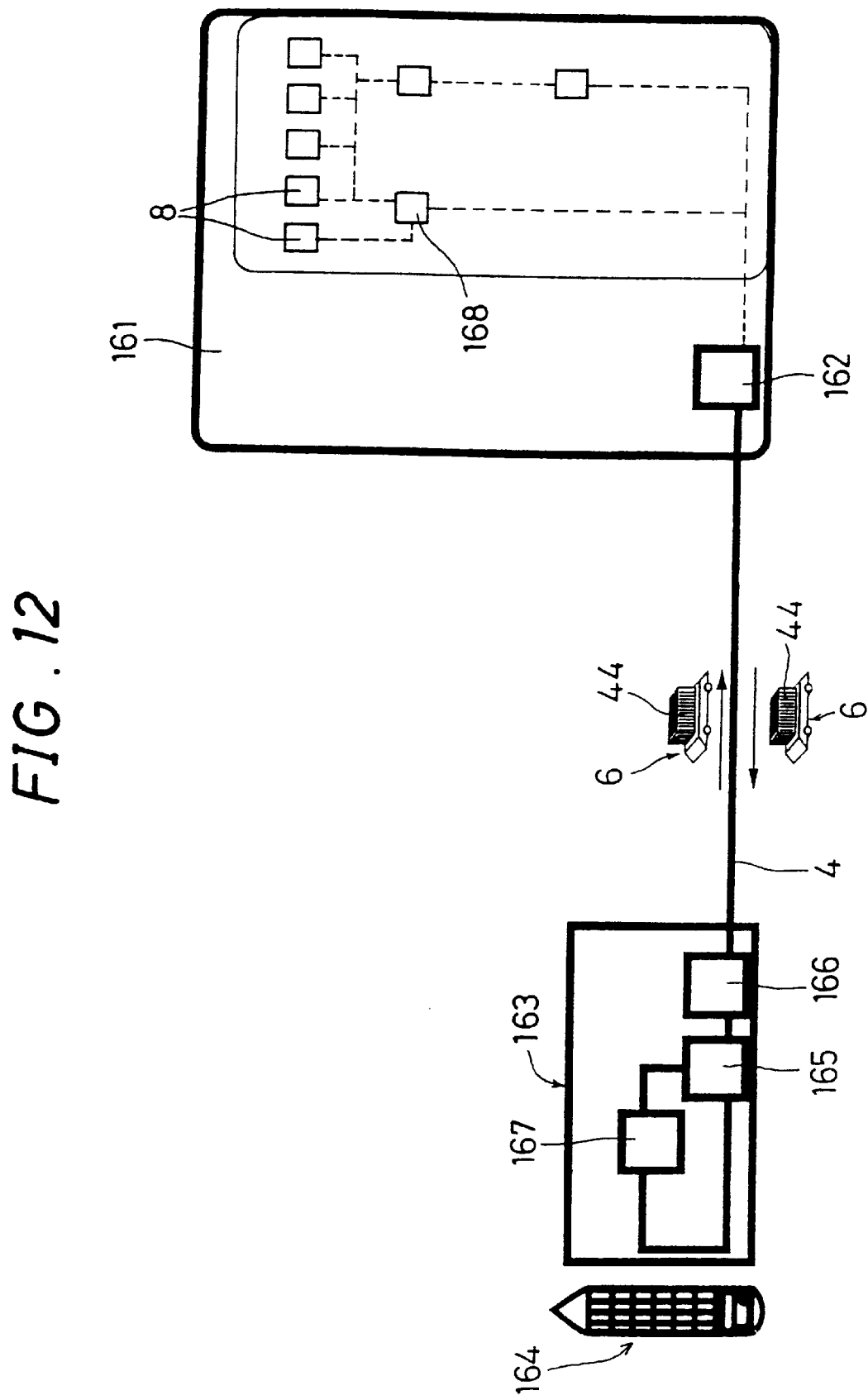
FIG. 12 is a simplified view showing a physical distribution/transportation system in which a pallet vehicle travels between an offshore node and an inland node.

Although the embodiment shown in FIG. 10 and FIG. 11 constitutes a comparatively large physical distribution/transportation system for transporting the container 44 unloaded at a dock of a harbor to a desired node among a plurality of the nodes 2, the embodiment is applicable also to a comparatively simple physical distribution/transfer system shown in FIG. 12. In FIG. 12, the physical distribution/transportation system is constituted of an inland node 162 which is arranged in relation to a specific city of an inland area 161, and an offshore node 163 which is arranged offshore. The offshore node 163 may be constituted of, for example, a floating pier. The constitution of the offshore node 163 is substantially the same as that of the harbor node 132 as shown in FIGS. 10 and 11 and a detailed explanation thereof will be omitted. The offshore node 163 is provided with a dock alongside which a container ship 164 as a transport ship arrives (although not illustrated, a crane is provided at the dock), a customhouse 165, a pallet vehicle storage yard 166 and a vacant pallet vehicle storage yard 167. The customhouse 165 is provided with a low-speedtravel or temporary-stop area and during a time period in which the pallet vehicle travels at the low-speed-travel or temporary-stop area, customs clearance of cargoes contained in the container 44 loaded onto the pallet vehicle 6 is carried out. The pallet vehicles 6 loaded with the containers 44 are temporarily stored in the pallet vehicle storage yard 166. Further; vacant ones of the pallet vehicles 6 are temporarily stored in the vacant pallet vehicle storage yard 167.

The offshore node 163 and the inland node 162 are connected via the dedicated traveling line 4 similar to as described above. The offshore node 163 is arranged at the offshore location remote from the inland area 161, and accordingly, the offshore node 163 and the inland area 161 are connected via a bridge or tunnel (not illustrated) and the above-described dedicated traveling line 4 is arranged on the bridge or in the tunnel connecting the two. In this way, the pallet vehicles 6 which travel autonomously between the offshore node 163 and the inland node 162 are made to travel whereby physical distribution/transportation can be achieved efficiently.

Further, the inland node 162 and the respective users 8 are connected via the ordinary roads 18 and the containers 44 are delivered by utilizing the ordinary vehicles 20 (FIG. 2) such as trucks. Further, a container storage yard 168 for temporarily storing the containers 44 can be provided between the inland node 162 and the users 8 as necessary.

Figure 13:
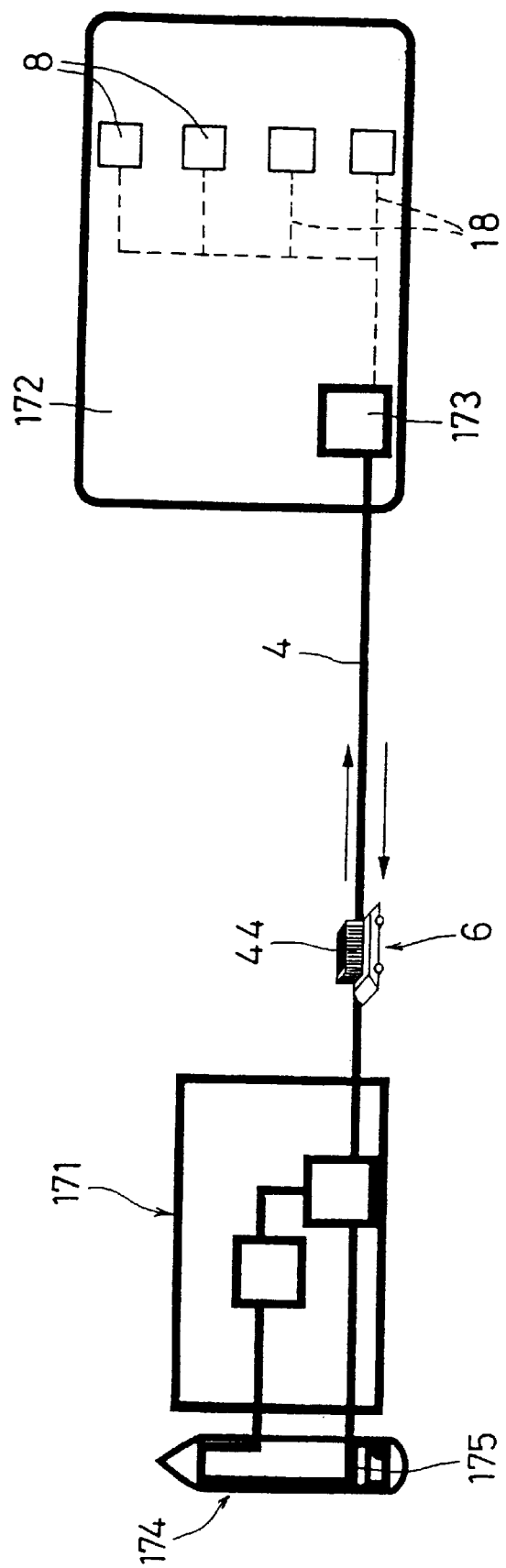
FIG. 13 is a simplified view showing a system of a type of directly loading a pallet vehicle onto a transport ship.

Although the embodiment of FIG. 12 is constituted such that the containers 44 unloaded from the pallet vehicle 6 are loaded to the container ship 164, in place thereof, as shown in FIG. 13, the pallet vehicle 6 loaded with the container 44 can be constituted to be loaded to a transport ship. In FIG. 13, an offshore node provided at offshore (or at harbor) is a pallet vehicle node 171. Further, an inland area 172 is provided with an inland node 173, and the pallet vehicle node 171 and the inland node 173 are connected by the dedicated traveling line 4 arranged on a bridge or in a tunnel (not illustrated) for connecting the offshore area and the inland area 172. Further, the dedicated traveling line 4 is extended to a dock alongside which a transport ship 174 arrives. Further, a dedicated traveling line 175 is arranged also inside the transport ship 174, and when the transport ship 174 arrives alongside the dock in a pre-determined manner, the dedicated traveling line 175 of the transport ship 174 is connected to the dedicated traveling line 4 extended to the offshore dock.

In the physical distribution/transportation system having such a pallet vehicle node 171, when the transport ship 174 a arrives alongside the dock of the offshore node 171, the dedicated traveling line 175 of the transport ship 174 is connected to the dedicated traveling line 4 extended to the dock, and the pallet vehicle 6 from the inland node 173 loaded with the container 44 can directly loaded to the transport ship 174 as it is. Accordingly, it is not necessary to carry out a reloading operation of the container 44 and a crane for loading the container 44 is also dispensed with. Further, also in unloading the pallet vehicle 6 from the transport ship 174 which has transported the pallet vehicle 6 loaded with the container 44, only the pallet vehicle 6 is moved from the dedicated traveling line 175 of the transport ship 174 to the dedicated traveling line 4 at the dock, and the operation is facilitated and can be carried out without using a crane.

Further, since the inland node 173 and the users 8 are connected via the ordinary roads 18, the container 44 which has been transported to the inland node 173 is delivered to a delivery destination (specific user 8) by using the ordinary vehicle 20 (FIG. 2) such as a truck. Further, the containers 44 from the users 8 are also collected to the inland node 173 by the ordinary vehicles 20 traveling on the ordinary roads 18.

Figure 14:
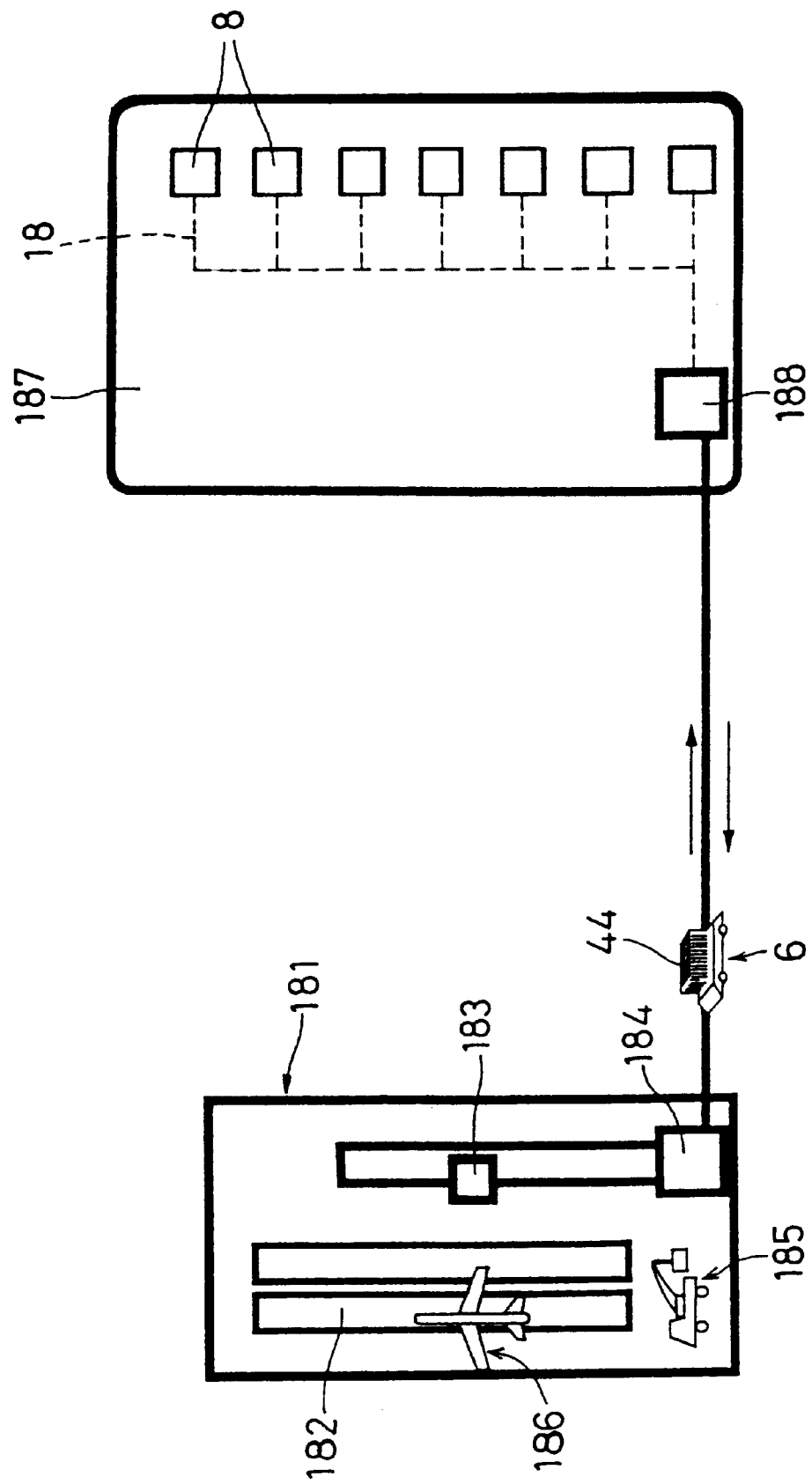
FIG. 14 is a simplified view showing a physical distribution/transportation system having an airport node.

FIG. 14 shows an outline of an airport node provided at an airport in place of a harbor node provided at a harbor. In FIG. 14, an airport node 181 is provided with a vacant pallet vehicle storage yard 183 arranged in a vicinity of a runway 182 of the airport, and a customhouse 184. Vacant ones of the pallet vehicles 6 which are not loaded with the containers 44 are temporarily stored in the vacant pallet vehicle storage yard 183. Further, the customhouse 184 has a constitution substantially the same as that of the customhouse 136 of FIG. 11, namely, provided with a customs inlet section, a customs outlet section and a low-speed-travel or temporary-stop area which is arranged between the sections and arrives at vicinities thereof. In the customhouse 184, customs clearance of the containers 44 loaded on the pallet vehicles 6 is carried out during a time period in which the pallet vehicles 6 travel through the low-speed-travel or temporary-stop area. Further, when some time period is required in customs clearance or the like, the containers 44 are unloaded from the pallet vehicles 6 at the customs inlet section and are loaded onto the pallet vehicles 6 at the customs outlet section after having finished the customs clearance. The customhouse 184 can be arranged not in the airport node 181 but in a vicinity thereof.

Further, the airport node 181 includes a traveling crane 185 capable of traveling freely at the runway 182 and a surrounding area thereof. The traveling crane 185 may be constituted by a traveling vehicle provided with a crane mechanism. An airplane 186 such as an airplane for transportation is stopped at the runway 182 or in a vicinity thereof in the airport node 181, and the container 44 which has been transported by the airplane 186 is hung by the traveling crane 185 and is loaded directly onto the pallet vehicle 6. Further, the container 44 transported by the pallet vehicle 6 is directly loaded to inside of the airplane 186 by the traveling crane 185.

The airport node 181 and an inland node 188 of an inland area 187 are connected via the dedicated traveling line 4. When the airport node 181 is arranged at an offshore location remote from the inland area, the airport node 181 and the inland area 187 are connected via a bridge or tunnel (not illustrated) and the dedicated traveling line 4 is arranged on the bridge or in the tunnel. The inland node 188 and the users 8 are connected via the ordinary roads 18, and the containers 44 transported to the inland node 188 are delivered to the users 8 of delivery destinations by the ordinary vehicles 20 (FIG. 2).

Further, although the illustrated embodiment is a system in which the dedicated traveling line 4 is arranged between the offshore airport node 181 and the inland node 188, the constitution is also applicable to a physical distribution/transportation system utilizing the airport node 181 as one of a plurality of the nodes 2 of FIG. 1. In this case, the plurality of nodes 2 arranged in the inland area 187 and the inland node 188 are connected via the dedicated traveling line 4.

Further, although in the illustrated embodiment, the container 44 loaded onto the pallet vehicle 6 is reloaded from the pallet vehicle 6 to the airplane 186 by the traveling crane 185, the pallet vehicle 6 loaded with the container 44 can also be loaded directly onto the airplane 186. In this case, the dedicated traveling line 4 from the inland node 188 is extended to the runway 182 or a vicinity thereof and a dedicated traveling line (not illustrated) is arranged inside of the airplane 186. When the airplane 186 is moved to a predetermined position, the dedicated traveling line 4 at the runway 182 or in a vicinity thereof is connected to a dedicated traveling line (not illustrated) of the airplane 186 and by traveling the dedicated traveling line 4, the pallet vehicle 6 loaded with the container 44 can directly be loaded onto the airplane 186 and the pallet vehicle 6 loaded with the container 44 can directly be unloaded from the airplane 186. Accordingly, the container 44 does not need to be reloaded, loading and unloading of the container 44 to and from the airplane 186 are facilitated, and the traveling crane 185 is also dispensed with.

Figure 15:
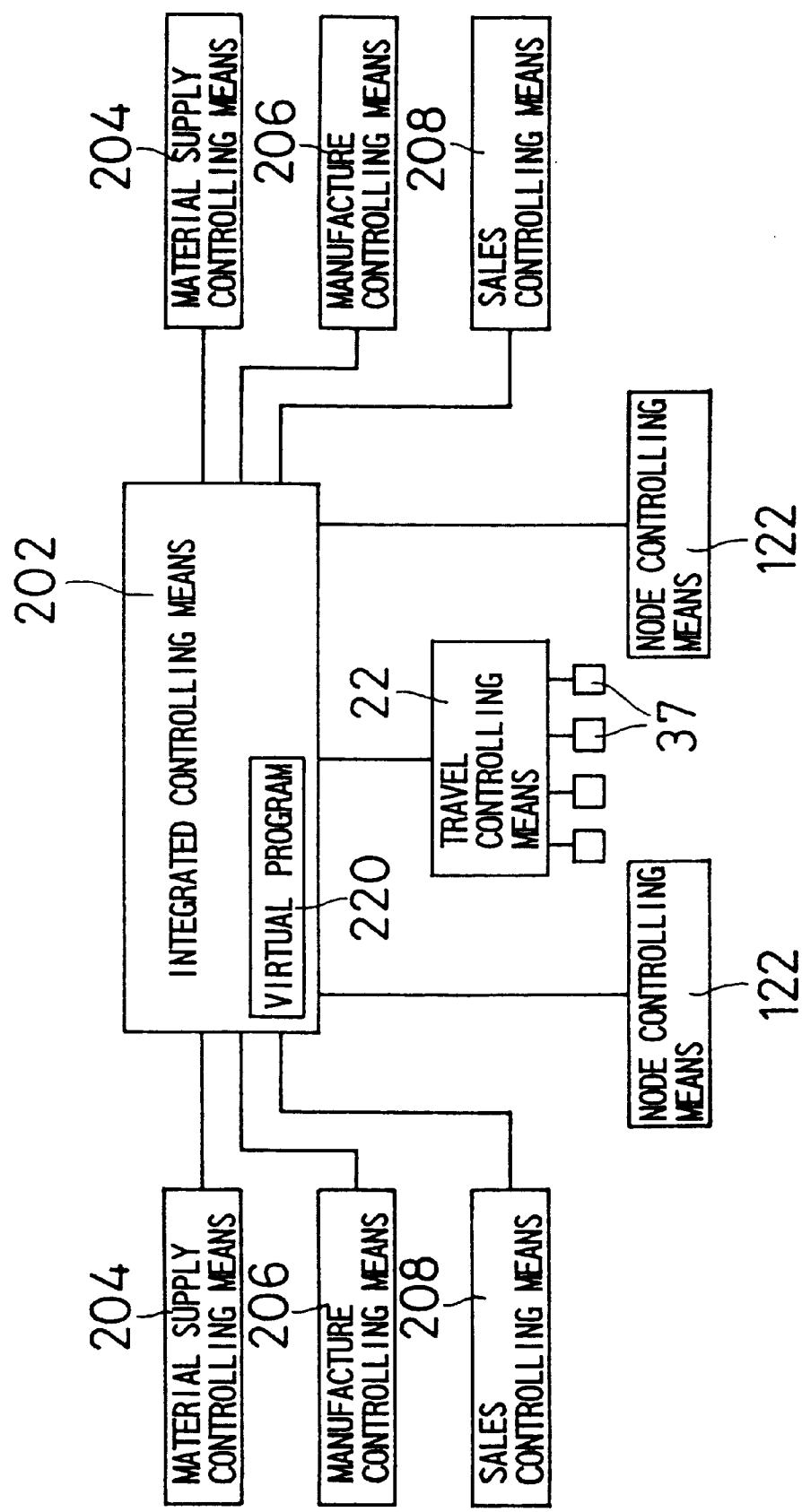
FIG. 15 is a simplified block diagram showing a control system of an integrated physical distribution system according to the invention.

Although an explanation has been given of preferable embodiments of the physical distribution/transportation system according to the invention as mentioned above, such a physical distribution/transportation system can be part of an integrated physical distribution system, as shown here, by being combined with a sales system by sellers, a manufacturing system by manufacturers and a material supply system by material suppliers. In reference to FIG. 15, an integrated physical distribution system including a physical distribution/transportation system is provided with an integrated controlling system 202 for integrally controlling the integrated physical distribution system. The integrated controlling system 202 can be constituted of a super mainframe computer for controlling a total of the integrated physical distribution system. The integrated controlling system 202 is connected to the travel controlling system 22 and the node controlling system 122 in the physical distribution/transportation system. The travel controlling system 22 is stored with pallet vehicle travel information regarding time periods required for the pallet vehicle 6 to travel among the respective nodes 2, cost and so on. The node controlling system 122 is stored with physical distribution/transportation information regarding stored cargoes, inventories of the users 8, storage of vacant pallet vehicles and so on. The above-described information is transferred among the integrated controlling system 202, the travel controlling system 22 and the node controlling system 122. The travel controlling system 22 is for controlling operation of the pallet vehicle 6 traveling on the dedicated traveling line 4, and operational information with regard to traveling of the respective pallet vehicles 6 and so on is transferred between the travel controlling system 22 and the pallet vehicle controlling system 37 provided at the respective pallet vehicles 6. Further the node controlling system 122 is for controlling flows of cargoes, the pallet vehicles 6 and so on at the respective nodes 2.

The integrated controlling system 202 is connected to material supply controlling system 204 in material supply systems owned by material suppliers who are the users 8 of the physical distribution/transportation system. The material supply controlling system 204 is constituted of a mainframe computer, the controlling system 204 is stored with material supply information with regard to time, cost, facilities and so on for manufacturing materials, and this information is transferred between the integrated controlling system 202 and the material supply controlling system 204. The integrated controlling system 202 is similarly connected to each of a manufacturing controlling system 206 in manufacturing systems owned by manufacturers, and a sales controlling system 208 in sales systems owned by sellers. The manufacturing controlling system 206 and the sales controlling system 208 are constituted of mainframe computers. The manufacturing controlling system 206 is stored with manufacturing information with regard to parts, time, cost, facili-ties and so on for manufacturing products of manufacturers. The sales controlling system 208 is stored with sales information with regard to sales costs, sales situation and so on of products handled by sellers. The above-described information is transferred between the integrated controlling system 202 and the manufacture controlling system 206 as well as the sales controlling system 208. Further, each of the integrated controlling system 202, the travel controlling system 22, the pallet vehicle controlling system 37, the node controlling system 122, the material supply controlling system 204, the manufacture controlling system 206 and the sales controlling system 208 includes a system inputting device (not illustrated) constituted of a microcomputer including, for example, an input keyboard.

Figure 16:
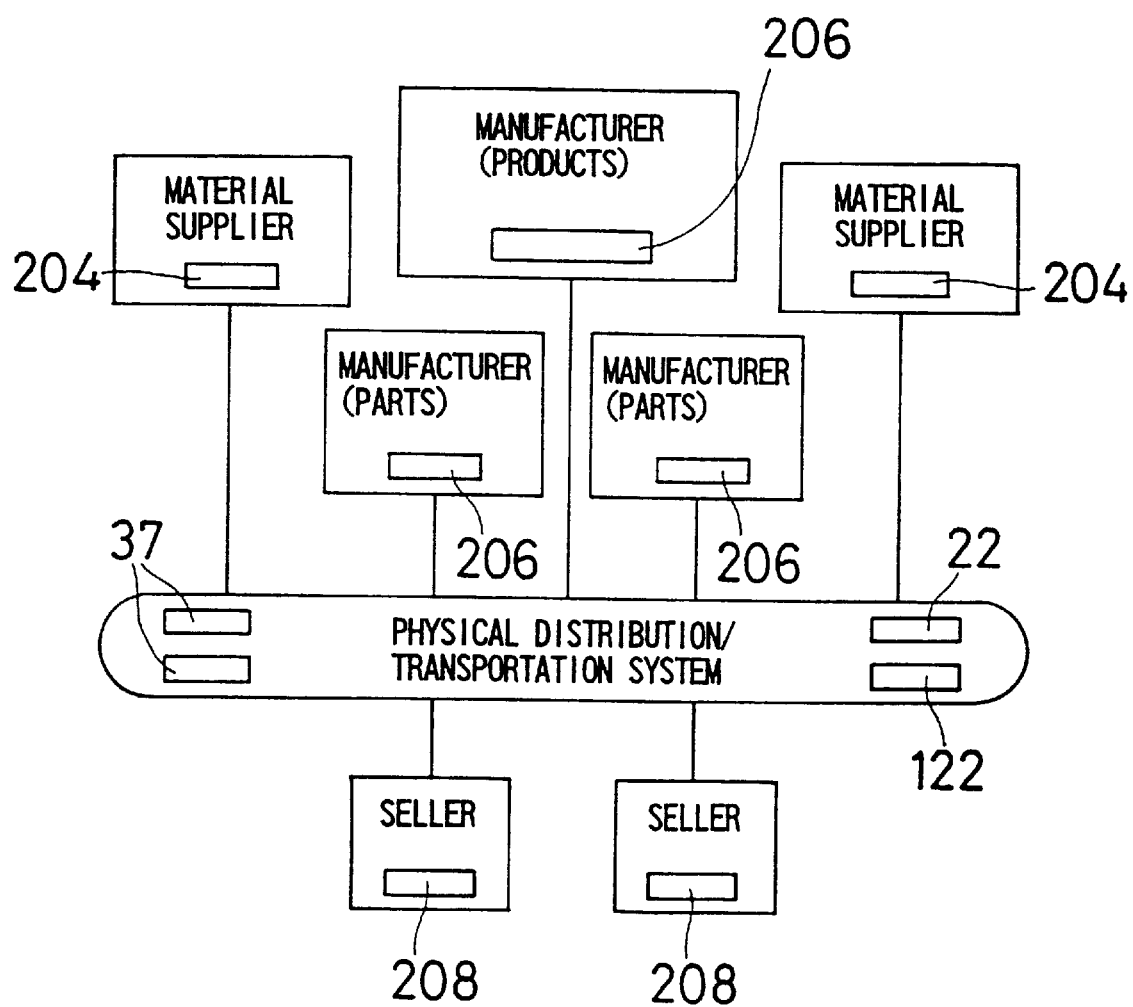
FIG. 16 is a view for explaining a system constitution in the integrated physical distribution system of FIG. 15.

In the integrated physical distribution system, a flow of materials, parts and products as cargoes is as shown in FIG. 16. That is, cargoes (materials, parts and products) from material suppliers and manufacturers are transported to the node 2 (node corresponding to area where traders are present) in the physical distribution/transportation system. Cargoes (materials, parts and products) to material suppliers, manufacturers and sellers are also transported to a node 2 (node corresponding to area where the traders are present) in the physical distribution/transportation system. Transportation, of cargoes between the nodes 2 in the physical distribution/transportation system is carried out by the pallet vehicles 6 utilizing the dedicated traveling line 4. Accordingly, a total of the physical distribution system centers on the physical distribution/transportation system, material suppliers, and manufacturers and sellers connected via the physical distribution/transportation system. Cargoes are not transported individually for respective traders but an integrated physical distribution system including all trades of traders is constituted. Further, the integrated controlling system 202 (FIG. 15) controls the travel controlling system 22 and the node controlling system 122 in the physical distribution/transportation system based on various information from the material supply controlling system 204 of material suppliers, the manufacture controlling system 206 of manufacturers and the sales controlling system 208 of sellers. Operation of the pallet vehicles 6 is controlled by the travel controlling system 22 and the node controlling system 122. Accordingly, operation of the pallet vehicles 6, management of the vacant pallet vehicles 6 and so on are efficiently carried out in view of a total of the physical distribution system, and improved efficiency of delivery of cargoes, reduction of delivery time periods, delivery costs and so on can be achieved.

Figure 17:
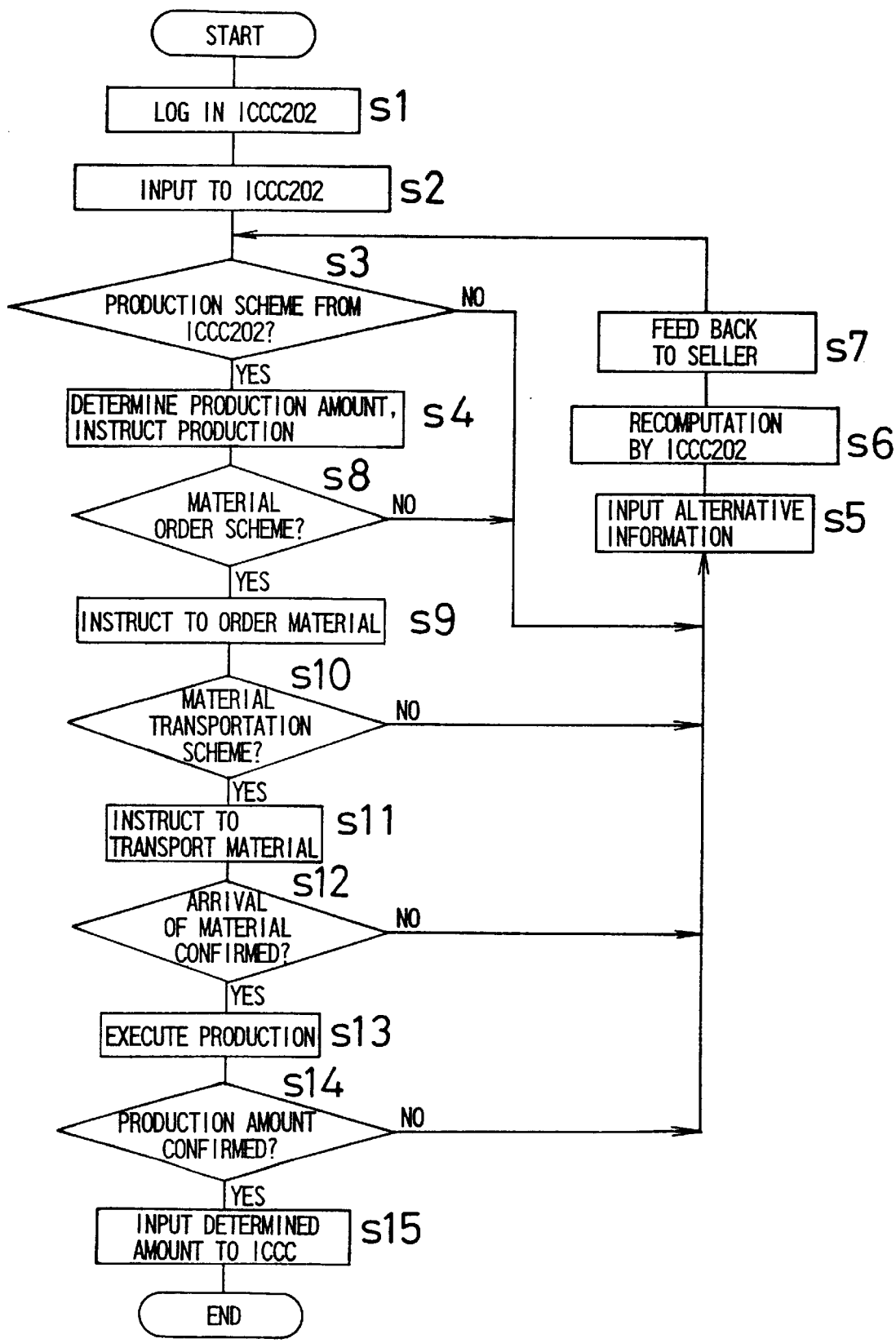
FIG. 17 is a flowchart showing physical distribution of a manufacturer in an integrated physical distribution system.

Next, an explanation will be given of physical distribution in the integrated physical distribution system in reference to FIGS. 17 through 22. First, an explanation will be given of the physical distribution in manufacturers when the integrated physical distribution system is used in reference to FIG. 17. Physical distribution in manufacturers is carried out by transfer of information mainly among the integrated controlling system 202 for controlling a total of the system, the manufacture controlling system 206 in manufacturers using the system, the material supply controlling system 204 in material suppliers related to the manufacturers, the travel controlling system 22 and the node controlling system 122 in the physical distribution/transportation system. In FIG. 17, when a specific manufacturer uses the integrated physical distribution system, the manufacturer accesses the integrated controlling system 202 by logging into the integrated controlling system 202 (designated by "ICCC" in the flowchart) by operating the system inputting device (not illustrated) of the manufacture controlling system 206 of the manufacturer. When access has been made in this way, the operation proceeds from step S1 to step S2 and a user code number of the specific manufacturer, a number of products to be manufactured and so on are inputted by the above-described system inputting device. The input information by the inputting device is transmitted to the integrated controlling system 202 via the manufacture controlling system 206. When information with regard to manufacturing is inputted in this way, the integrated controlling system 202 forms a production scheme of the product based on the inputted information and transmits the formed production scheme to the manufacture controlling system 206. At step S3, it is determined whether the production scheme formed by the integrated controlling system 202 is of a content desired by the specific manufacturer. Further, when the production scheme (or alternative production scheme) is of a desired content, the operation proceeds to step S4, where determination of a production amount and instruction of production are carried out from the integrated controlling system 202 to the manufacture controlling system 206.

Meanwhile, when the production scheme is not of a content which is satisfactory in view of manufacturing cost, delivery time of products and so on, the operation proceeds to step S5, where alternative scheme information is inputted by the system inputting device. When the alternative scheme information is inputted in this way, at step S6, the integrated controlling system 202 forms an alternative production scheme based on the inputted information and the alternative production scheme is fed back to a seller, mentioned later (step S7), thereafter, the operation returns to step S3. In this way, when the production scheme formed by the integrated controlling system 202 is not satisfactory to the manufacturer, steps S3, S5, S6 and S7 are repeated.

When the production amount is determined at step S4, the operation proceeds to step S8, where it is determined whether a material order scheme formed by the integrated controlling system 202 based on the production amount is of a content desired by the specific manufacturer. When it is of a desired scheme content, the operation proceeds to step S9, where order instruction of materials (in flowchart of FIG. 17, materials include parts necessary for producing products) is transmitted from the integrated controlling system 202 to the material supply controlling system 204 (in flowchart of FIG. 17, including manufacture controlling system 206 of manufacturer manufacturing parts) of a related material supplier (in flowchart of FIG. 17, including manufacturer of parts necessary for manufacturing the products). Meanwhile, when the material order scheme is not of a content desired by the specific manufacturer, the operation proceeds to steps S5 and S6, and the integrated controlling system 202 forms an alternative production scheme similar to the one above-described. Information based on the alternative production scheme is fed back to a seller, and thereafter the operation returns to step S3 and the above-described operation is repeated until the production scheme at step S3 and the material order scheme at step S8 become satisfactory contents.

The material order instruction is carried out at step S9, and successively at step S10 it is determined whether the material transportation scheme formed by the integrated controlling system 202 is satisfactory for the specific manufacturer. Further, when the material transportation scheme is of a content satisfactory for the specific manufacturer, the operation proceeds to step S11, where an instruction of material transportation is provided from the integrated controlling system 202 to the travel controlling system 22 and the node controlling system 122. Meanwhile, when the material transportation scheme is not of contents desired by the specific manufacturer, the operation proceeds to steps S5 and S6, and the integrated controlling system 202 forms an alternative scheme similar to the one above-described. Information based on the alternative scheme is fed back to the seller, thereafter the operation returns to step S3, and the above-described operation is repeated until the production scheme at step S3, the material order scheme at step S8 and the material transportation scheme at step 10 become satisfactory contents.

Next, at step S12, an operation of confirming day and time of arrival of materials delivered to the specific manufacturer is carried out on the basis of the material transportation scheme formed by the integrated controlling system 202. Further, when the material arrival day and time is of contents desired by the specific manufacturer, the operation proceeds to step S13. Meanwhile, when the material arrival day and time is not of the contents desired by the specific manufacturer, the operation proceeds to steps S5 and S6, and the integrated controlling system 202 forms an alternative scheme similar to the one above-described. Information based on the alternative scheme is fed back to the seller, thereafter the operation returns to step S3, and the above-described operation is repeated until the production scheme at step S3, the material order scheme at step S8, the material transportation scheme at step S10 and the material arrival day and time at step S12 become satisfactory contents.

At step S13 is carried out order of materials, transportation of materials and production of products in line with the production scheme, the material order scheme, the material transportation scheme and the material arrival day and time mentioned above. In this case, order of materials is controlled by the material supply controlling system 204 of the material supplier, transportation of materials is controlled by the travel controlling system 22 and the node controlling system 122 in the physical distribution/transportation system, and manufacturing the products is controlled by the manufacture controlling system 206 of the manufacturer.

Thereafter, at step S14, the production amount of products of the specific manufacturer is confirmed when the actual production amount is an amount desired by the specific manufacturer. The operation then proceeds to step S15, and the production amount is inputted to the integrated controlling system 202 and production of products at the specific manufacturer is finished. Meanwhile, when the actual production amount is smaller than the amount desired by the specific trader, the operation returns to steps S5 through S7, and a production scheme regarding a deficient amount is formed. The operation then returns to step S3 and the operations of steps S3 through S15 are carried out with respect to the deficient amount.

Further, since the production scheme from the integrated controlling system 202 at step S3 is carried out based on information stored in the material supply controlling system 204 of the material supplier as well as the travel controlling system 22 and the node controlling system 122 in the physical distribution/transportation system, the content of the production scheme formed there is hardly modified later and is normally in accordance with the formed scheme.

Since the system is thus constituted, the integrated controlling system 202 controls to integrate the travel controlling system 22 and the node controlling system 122 in the physical distribution/transportation system in addition to the controlling systems 204, 206 and 208 in the manufacturer of products, the material supplier (including manufacturer of parts of the products) and the seller with the result that the system becomes the integrated physical distribution system including all the trades, namely a system including not only physical distribution of cargoes but also production of materials, parts and products.

Figure 18:
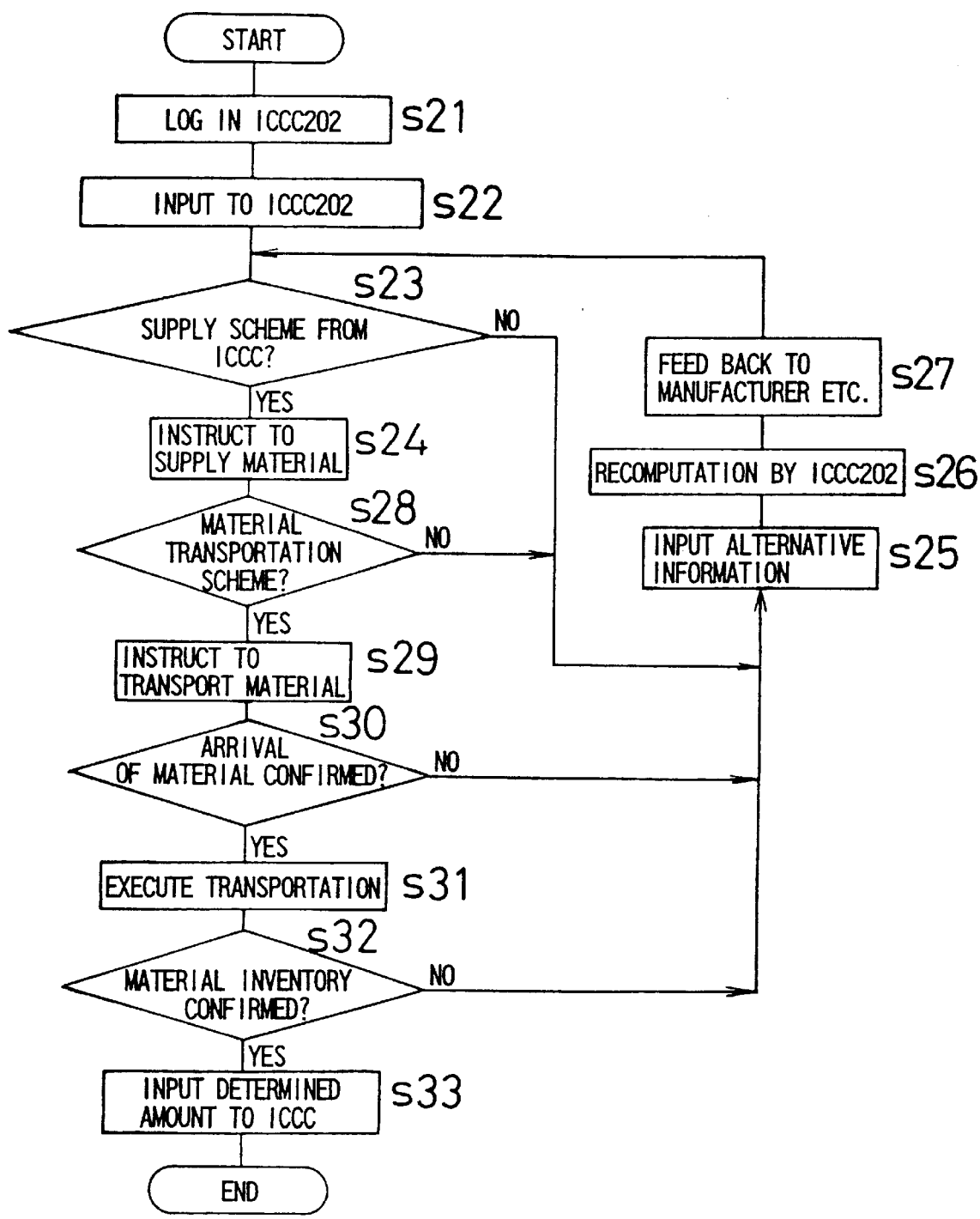
FIG. 18 is a flowchart showing physical distribution of a material supplier in an integrated physical distribution system.

FIG. 18 shows physical distribution in material suppliers when the integrated physical system is used. Physical distribution in material suppliers is carried out by transfer of information mainly among the integrated controlling system 202 for controlling a total of the system, the material supply controlling system 204 in the material suppliers using the system, the travel controlling system 22 and the node controlling system 122 in the physical distribution/ transportation system. In FIG. 18, when a specific material supplier uses the integrated physical distribution system, the specific material supplier makes access to the integrated controlling system 202 by logging into the integrated controlling system 202 by operating the system inputting device (not illustrated) of the material supply controlling system 204 of the supplier. When access has been made in this way, the operation proceeds from step S21 to step S22 and a user code number and the like of a specific manufacturer are inputted by the above-described system inputting device. Input information by the inputting device is transmitted to the integrated controlling system 202 via the material supply controlling system 204. When information is inputted in this way, a material supply scheme from the integrated controlling system 202 is transmitted to the material supply controlling system 204, and at step S23 it is determined whether the material supply scheme formed by integrated controlling system 202 is of a content desired by the material supplier. The material supply scheme is based on, for example, the material order instruction ordered at step S9 in the physical distribution of the manufacturer in FIG. 17. Further, when the material supplier makes a scheme of its own, the scheme can also be provided by inputting supply information desired by the specific material supplier by operating the system inputting device in the material supply controlling system 204.

At step S23, when the material supply scheme from the integrated controlling system 202 is of a content desired by the specific material supplier, the operation proceeds to step S24 and an instruction for supplying materials is provided from the integrated controlling system 202 to the material supply controlling system 204. Meanwhile, when the material supply scheme is not of a content satisfactory in view of delivery time or the like, the operation proceeds to step S25, where alternative supply information is inputted by the system inputting device. When the alternative supply information is inputted in this way, at step S26 the integrated controlling system 202 forms an alternative supply scheme based on the inputted information and the alternative supply information is fed back to a manufacturer and a seller who need the alternative supply information (step S27), and thereafter the operation returns to step S23. In this way, when the supply scheme formed by the integrated controlling system 202 is not satisfactory to the material supplier, steps S23, S25 through S27 are repeated.

When the material supply instruction is carried out at step S24, successively at step S28, it is determined whether a material transportation scheme formed by the integrated controlling system 202 is satisfactory to the specific material supplier. Further, when the material transportation scheme is of contents satisfactory to the specific manufacturer, the operation proceeds to step S29 and an instruction of material transportation is provided from the integrated controlling system 202 to the travel controlling system 22 and the node controlling system 122. Meanwhile, when the material transportation scheme is not of the content desired by the specific material supplier, the operation proceeds to steps S25 through S27, and the integrated controlling system 202 forms an alternative scheme similar to the one above-described. Information based on the alternative scheme is fed back to the manufacturer and the seller, and thereafter the operation returns to step S23 and the above-described operation is repeated until the material supply scheme at step S23 and the material transportation scheme at step S28 become satisfactory contents.

Next, at step S29, an instruction of material transportation is provided, to the material supply controlling system 204 based on the material transportation scheme formed by the integrated controlling system 202, and thereafter at step S30 is carried out an operation of confirming day and time of arrival of materials delivered to the manufacturer. Further, when the material arrival day and time is of contents desired by the manufacturer, the operation proceeds to step S31. Meanwhile, when the material arrival day and time is not of the contents desired by the manufacturer, the operation proceeds to steps S25 through S27, and the integrated controlling system 202 forms an alternative scheme similar to the one above-described. Information based on the alternative scheme is fed back to the manufacturer and the seller, and thereafter the operation returns to step S23, and the above-described operation is repeated until the material supply scheme at step S23, the material transportation scheme at step S28, the material transportation scheme at step S30 and the material arrival day and time at step S30 become satisfactory contents.

At step S31 is carried out supply of materials in line with the material supply scheme, the material transportation scheme and the material arrival day and time mentioned above. In this case, supply of materials is controlled by the material supply controlling system 204 of the material supplier, and transportation of materials is controlled by the travel controlling system 22 and the node controlling system 122 in the physical distribution/transportation system.

Thereafter, at step S32 is carried out confirmation of inventory of materials of the specific material supplier, and when the inventory is not sufficient, the operation returns to step S23 via the steps S25 through S27. Meanwhile, when the inventory sufficiently remains, the operation proceeds to step S33, where an inventory amount of material is inputted to the integrated controlling system 202, whereby supply of materials to the manufacturer by the specific material supplier is finished.

The system is thus constituted, and the material supplier supplies materials necessary for manufacturing by the manufacturer, to the specific manufacturer in a predetermined manner by using the traveling pallet vehicles 6 in the physical distribution/transportation system based on the material order instruction from the integrated controlling system 202.

Figure 19:
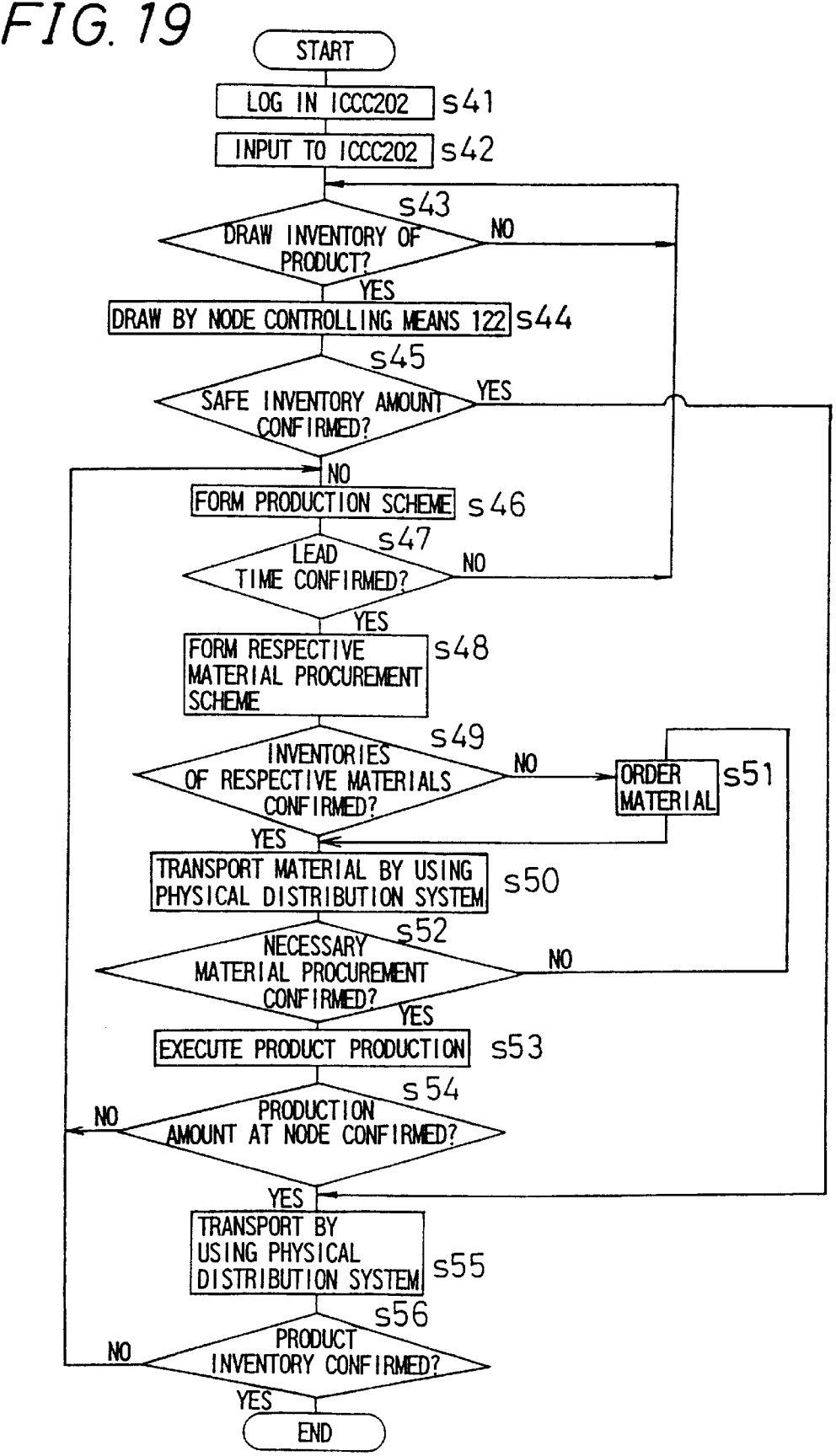
FIG. 19 is a flowchart showing physical distribution of a seller in an integrated physical distribution system.

FIG. 19 shows physical distribution of a seller when the integrated physical distribution system is used. The physical distribution of sellers is carried out by transfer of information mainly among the integrated controlling system 202 for controlling the total of the integrated physical distribution system, the sales controlling system 208 of sellers using the system, the manufacture controlling system 206 of manufacturers, the material supply controlling system 204 of material suppliers, and the travel controlling system 22 and the node controlling system 122 in the physical distribution/transportation system. In FIG. 19, when a specific seller uses the integrated physical distribution system, the specific seller accesses the integrated controlling system 202 by logging into the integrated controlling system 202 by operating the system inputting device (not illustrated) of the sales controlling system 204 of the seller. When access has been made in this way, the operation proceeds from step S41 to step S42. At step S42, the specific seller inputs a product name, necessary amount, delivery time etc. of a necessary product in addition to a user code by operating the system inputting device. When the input has been finished, the operation proceeds to step S43, where it is determined whether an inventory amount of the product is an amount necessary for the seller at the node 2 (FIG. 1) corresponding to a manufacturer of the product based on the instruction from the integrated controlling system 202. Further, when delivery of the product can be carried out by the inventory amount at the node 2, the operation proceeds to step S44. When the delivery of the product is difficult with the inventory amount, the operation returns to step S42 and inputs again a necessary amount.

At step S44, the integrated controlling system 202 subtracts a necessary amount which is needed this time from the inventory amount stored to the node controlling system 122 of the corresponding node 2. Thereafter, at step S45 it is determined whether a safe inventory amount is ensured at the node 2 even after subtracting the necessary amount. Further, when the safe inventory amount is ensured, the operation proceeds to step S55. Meanwhile, when the safe inventory amount is not ensured, the operation proceeds to step S46, where the integrated controlling system 202 forms a production scheme for ensuring the safe inventory amount. As mentioned above, the integrated controlling system 202 forms the production scheme based on information stored in the material supply controlling system 204 and the manufacture controlling system 206 as well as the travel controlling system 22 and the node controlling system 122 in the physical distribution/transportation system.

Thereafter, the operation proceeds to step S46 and it is determined whether a lead time for producing products is of contents desired by the specific seller. When the lead time is not of the contents desired by the specific seller, the operation returns to step S42, where the contents are reset by the system inputting device. Meanwhile, when the lead time is of the contents desired by the seller and the manufacturer, the operation proceeds to step S48 and the integrated controlling system 202 forms a material procurement scheme for manufacturing the product.

Next, at step S49, it is determined whether a necessary amount of inventory of material is stored at the node 2 (FIG. 1) corresponding to a material supplier for supplying materials. When the necessary amount of material is stored, material transportation instruction is transmitted from the integrated controlling system 202 to the node controlling system 122 and the travel controlling system 22 of the corresponding node 2, and materials are delivered to a manufacturer of the product from the corresponding node 2 by unitizing the pallet vehicles 6 of the physical distribution/transportation system. Meanwhile, when the necessary amount of material is not stored, the operation proceeds from step S49 to step S51, and order of materials to a material supplier is carried out, the ordered materials are delivered to the manufacturer of the product by utilizing the pallet vehicles 6 of the physical distribution/transportation system similar to the one above-described at step S50. Order of materials to the material supplier and transportation therefrom are carried out along a flow of physical distribution similar to that shown in FIG. 18.

Next, the operation proceeds to step S52 and it is confirmed whether materials necessary for producing the necessary amount of the product are ensured at the manufacturer of the product. Further, when the necessary amount of material is not ensured in the confirmation operation, the operation returns to step S51, where order of materials in respect of a deficient amount is carried out by instruction from the integrated controlling system 202. Meanwhile, when the necessary amount of material is ensured, the operation proceeds to step S53, where production of the product is carried out by the manufacture controlling system 206 by the manufacturer. Further, the produced product is transported to the corresponding node 2 and stored at the node 2 as the inventory, and at step S54 a production amount of the product by the manufacturer is confirmed. When the production amount is smaller than a schemed amount in the confirmation operation, the operation returns to step S46, and the integrated controlling system 202 forms a production scheme regarding a deficient amount and the operations of steps S47 through S54 are carried out as follows. Meanwhile, when the production amount by the manufacturer is as schemed (or safe inventory is ensured at node 2 at step S45), the operation proceeds to step S55, where the product stored at the node 2 is delivered to the specific seller by utilizing the pallet vehicles 6 of the physical distribution/transportation system, and thereafter at step S56, the inventory amount of the product is confirmed at the node 2. When the inventory amount is deficient at the node 2, the operation returns to step S46, a production scheme regarding the deficient amount is formed by the integrated controlling system 202 and step S47 and later steps are carried out. Meanwhile, when a sufficient inventory amount is stored at the node 2, delivery and physical distribution of the product in response to request of the product from the specific seller are finished.

Product and material are thus transported and inventory at the respective node 2 is effectively utilized, whereby efficiency of transportation of product and material is enhanced and reduction of delivery time is achieved. Further, the system functions effectively as the integrated physical distribution system including sellers, manufacturers and material suppliers.

Figure 20:
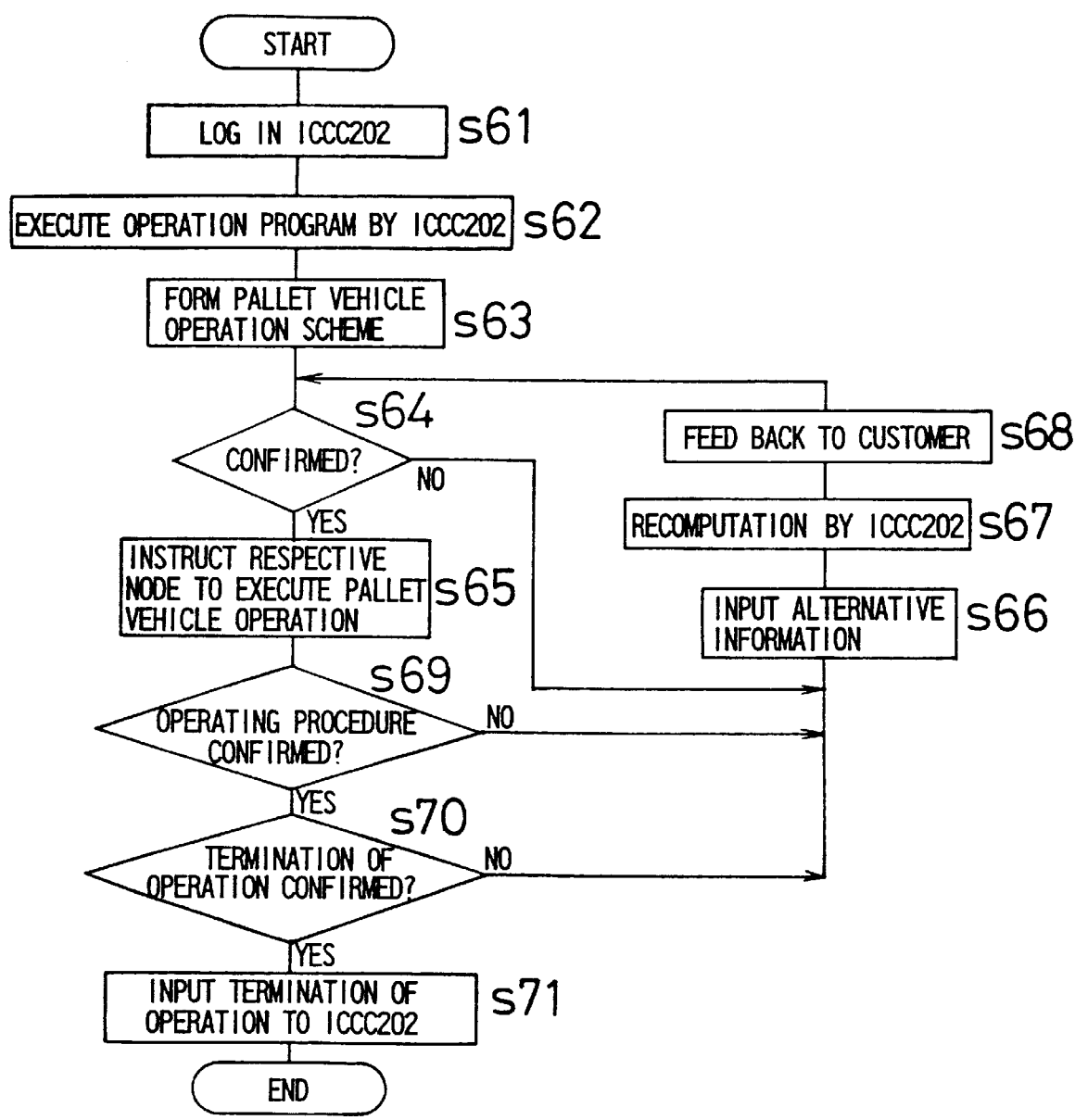
FIG. 20 is a flowchart for explaining a flow of control of pallet vehicles in a physical distribution/transportation system in an integrated physical distribution system.

FIG. 20 shows control of travel of the pallet vehicle 6 (FIGS. 2, 3) when the integrated physical distribution system is used. The travel of the pallet vehicle 6 is carried out by transfer of information mainly between the integrated controlling system 202, the travel controlling system 22 and node controlling system 122 in the physical distribution/transportation system. In FIG. 20, when travel control of the pallet vehicle 6 is carried out in the integrated physical distribution system, a controller for controlling traveling of the pallet vehicle 6 accesses the integrated controlling system 202 by logging into the integrated controlling system 202 by operating the system inputting device (not illustrated) in the node controlling system 122 of the node 2 or the system inputting device (not illustrated) in the travel controlling system 22. When access has been made in this way, the operation proceeds from step S61 to step S62. At step S62, the integrated controlling system 202 carries out an operation program and forms a travelling scheme of the pallet vehicle 6 based on information stored in the travel controlling system 22 and the node controlling system 122 (step S63).

Next, the operation proceeds to step S64, where it is determined whether contents of a pallet vehicle travel scheme are satisfactory. When the contents of the pallet vehicle operation scheme are satisfactory, the operation proceeds to step S65. Meanwhile, when the pallet vehicle operation scheme is not of satisfactory contents, the operation proceeds to step S66, where alternative operation information is inputted by the system inputting device. When the alternative operation information is inputted in this way, at step S67 the integrated controlling system 202 forms an alternative operation scheme based on the inputted information. The alternative operation information is fed back to a material supplier, a manufacturer and a seller who need the alternative operation information (at step S68), and thereafter the operation returns to step S64. In this way, when the operation scheme formed by the integrated controlling system 202 is not satisfactory to the operation controller, steps S64 through S68 are repeated.

When the pallet vehicle operation scheme becomes satisfactory and the operation proceeds to step S65, an instruction for executing pallet vehicle operation is provided from the integrated controlling system 202 to the node controlling system 122 and the travel controlling system 22 of the respective nodes 2, whereby an operation in accordance with contents of the operation scheme of the pallet vehicle 6 is carried out. Further, during operation of the pallet vehicle 6, it is determined whether the pallet vehicle 6 is operated in accordance with the operation scheme (step S69). When some trouble or the like is caused and the pallet vehicle 6 does not travel in accordance with the operation scheme, the operation proceeds from step S69 to steps S66 through S68, and the integrated controlling system 202 forms an alternative operation scheme similar to the above-described and, thereafter, the operation returns to step S64. Meanwhile, when the pallet vehicle 6 travels in accordance with the operation scheme, the operation proceeds to step S70, where it is determined whether the pallet vehicle 6 arrives at a desired one of the nodes 2. When the pallet vehicle 6 arrives at the desired node 2, the operation proceeds to step S71, where finish of operation of the pallet vehicle 6 is inputted to the integrated controlling system 202 by operating the inputting device (not illustrated) at the node controlling system 122 or the travel controlling system 22, and the operation of the pallet vehicle 6 is finished by the input. Further, when at step S70, finish of the operation is not in accordance with the operation scheme, the operation returns to step S64 via steps S66 through S68 and the pallet vehicle 6 travels to the desired node 2 with re-schemed specifications.

Figure 21:
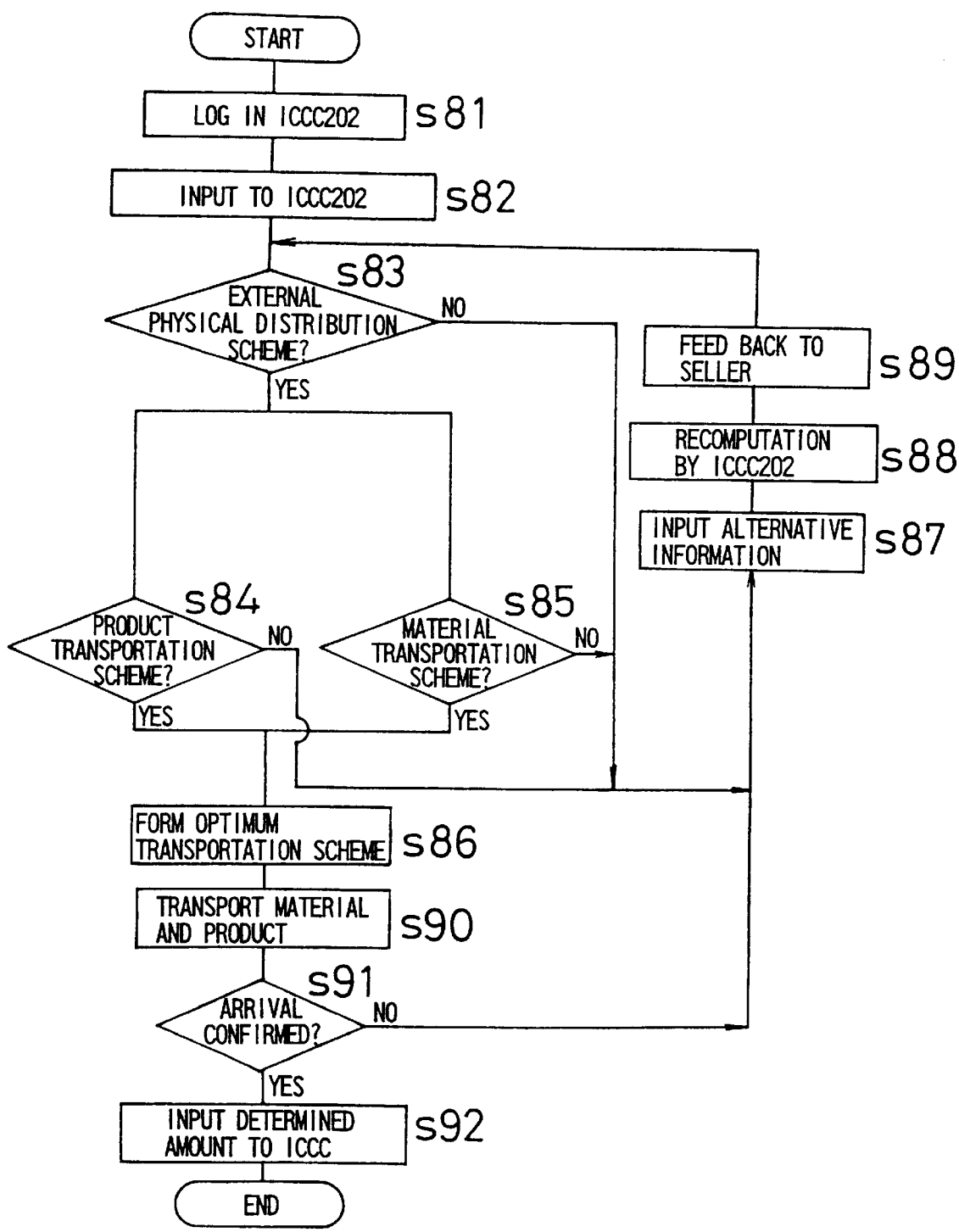
FIG. 21 is a flowchart showing a physical distribution in a physical distributor in an integrated physical distribution system.

Such an integrated physical distribution system can include a physical distributor, and FIG. 21 shows physical distribution of a physical distributor when the integrated physical distribution system is used. Physical distribution of physical distributors is carried out by transfer of information mainly among the integrated controlling system 202, physical distribution controlling system (not illustrated) in a physical distribution system of physical distributors using the system, the travel controlling system 22 and the node controlling system122 in the physical distribution/ transportation system. When a specific physical distributor uses the integrated physical distribution system, the operator accesses the integrated controlling system 202 by logging into the integrated controlling system 202 by operating a system inputting device (not illustrated) of the physical distribution controlling system of the distributor in FIG. 21. When the access has been made in this way, the operation proceeds from step S81 to step S82. At step S82, the specific physical distributor inputs a product name, necessary amount, delivery time, delivery location etc. of a necessary product in addition to a user code by operating the system inputting device.

When the input has been finished, the operation proceeds to step S83 and it is determined whether an external physical distribution scheme formed by the integrated controlling system 202 is satisfactory to the physical distributor. Further, when the external physical distribution scheme is satisfactory at step S83, the operation proceeds to steps S84 and S85 and it is determined whether respective transportation schemes of the product and the material are satisfactory to the physical distributor. When the product transportation scheme formed by the integrated system 202 is satisfactory at step S84, the operation proceeds to step S86, and when the material transportation scheme formed by the integrated controlling system 202 is of contents satisfactory to the physical distributor at step S85, the operation proceeds to step S86.

In the contrast thereto, when the external physical distribution scheme is not satisfactory contents at step S83, the operation proceeds to step S87, and the alternative information is inputted by the inputting device, the integrated controlling system 202 forms a new external physical distribution scheme based on the alternative information at successive step S88, contents of the formed scheme are fed back to a seller, a manufacturer and a material supplier, and the operation returns again to step S83. Further, when it is determined that the transportation scheme of the product (or material) is not satisfactory at step S84 (or S85), the operation proceeds from step S84 (or S85) to step S87, and the operator inputs alternative information with regard to transportation of the product (or parts), the integrated controlling system 202 forms a product (or parts) transportation scheme based on the inputted alternative information at step S88, the formed contents are fed back to the seller or the like (step S89) and thereafter, the operation returns to step S83. In this way, the above-described steps S83 through S85 and S87 through S89 are repeated until all of contents of the external physical distribution scheme at step S83, the product transportation scheme at step S84 and the material transportation scheme at step S85 become satisfactory.

When the operation proceeds to step S86 with these schemes as satisfactory, the integrated controlling system 202 forms an optimum transportation scheme of the pallet vehicles 6 based on information from the travel controlling system 22 and the node controlling system 122 of the respective nodes 2. According to the optimum transportation scheme, the operation of the pallet vehicles 6 is determined while satisfying the external physical distribution scheme, the product transportation scheme and the parts transportation scheme, mentioned above, such that the pallet vehicles 6 travel in a vacant state as little as possible and such that operation time periods of the pallet vehicles 6 are shortened as much as possible. By carrying out such an optimum transportation scheme, very efficient operation of the pallet vehicles 6 traveling on the dedicated traveling line 4 is made feasible.

Successively, at step S90 the operation of the pallet vehicles 6 in accordance with the contents of the optimum transportation scheme formed at step S86 is carried out, and thereafter it is confirmed whether the pallet vehicles 6 arrive at desired ones of the nodes 2 at step S91. When they arrive at the desired ones of the nodes 2, the operation proceeds to step S92, where amounts of transporting the product and material transported by the pallet vehicles 6 are inputted to the integrated controlling system 202 by the inputting device, whereby desired external physical distribution of the product and material is finished. Meanwhile, when arrival of the pallet vehicles 6 cannot be confirmed at step S91, the operation returns to step S83 via steps S87 through S89 and a transportation scheme with regard to the product and the material which have not arrived yet is formed by the integrated controlling system 202. The system is thus constituted, and the system can be integrated with a physical distribution system having a wider range including the physical distributors.

Such an integrated physical distribution system can also select an optimum condition by simulating a total of the system by a virtual mode. That is, the integrated controlling system 202 is provided with a virtual program 220 simulating the total of the system (see FIG. 15) and the virtual program 220 is carried out by the virtual mode, whereby optimum conditions with regard to lead time, cost, inventory and so on of a product, parts or the like and optimum conditions with regard to transportation time periods, transportation cost and the like of products, parts, materials and so on can be selected.

Figure 22:
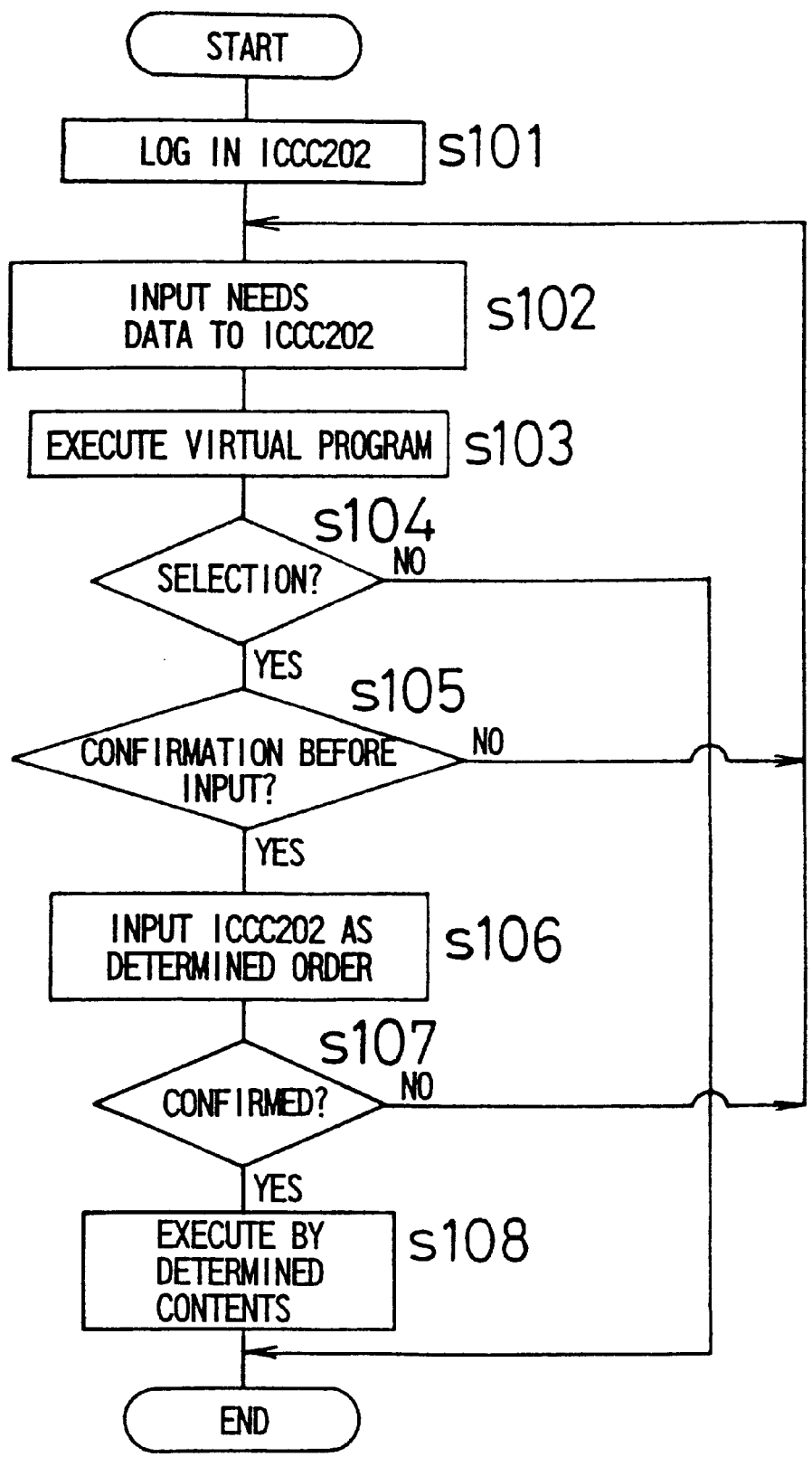
FIG. 22. is a flowchart showing a flow in executing a virtual program in an integrated physical distribution system.

FIG. 22 shows a flow of control by the integrated controlling system 202 having the virtual mode and an explanation will be given of the control as follows. In reference to FIG. 22, explaining a case in which, for example, a seller uses the integrated physical distribution system. A seller utilizing a simulation by the virtual mode accesses the integrated controlling system 202 by logging into the integrated controlling system 202 by operating a system inputting device (not illustrated) at the sales controlling system 208 owned by the seller. When access has been made in this way, the operation proceeds from step S101 to step S102 where the needs data, for example, a number of pieces of production, lead time, name of a manufacturer, name of a material distributor is inputted by the above-described system inputting device. When the input of data has been finished, at step S103 the virtual program 220 is carried out. The virtual program 220 is stored in a storing device of the integrated controlling system 202. In carrying out the program, the virtual program is read from the storing device, and the integrated controlling system 202 simulates lead time and cost required for producing a product with the specifications of the inputted needs based on material supply information stored in the material supply controlling system 204 in a material supply system of a material supplier, manufacturing information stored in the manufacture controlling system 206 in a manufacturing system of a manufacturer, sales information stored in the sales controlling system 208 in a sales system of a seller, and physical distribution/transportation information stored in the travel controlling system 22 and the node controlling system 122 in the physical y distribution/transportation system. Further, when the system includes a physical distributor, physical distribution information is stored in physical distribution a controlling system (not illustrated) in a physical distribution system of the physical distributor. Further, at step S104, it is determined whether a result of carrying out the virtual program 220 is to be selected, that is, whether the program is to be carried out as a system. When the seller adopts the result of the simulation of the virtual program 220, a determination mode is selected, and the operation proceeds to step S105. However, when the seller does not adopt the result, utilization of the system is finished.

When the determination mode is selected in order to use the simulation result at step S104, the operation proceeds to step S105 and specifications of the simulation result are confirmed. Further, in the reconfirmation, when the integrated physical distribution system is operated with the specifications of the simulation result, the operation proceeds to step S106 where the result is inputted to the integrated controlling system 202 as the determined specifications. Meanwhile, when it is determined that the result is not optimum, the operation returns from step S104 to step S102 where new needs data is inputted by the inputting device, and thereafter a virtual program based on the new needs data is carried out.

When the simulation result is inputted to the integrated controlling system 202 at step S106, the inputted specifications are fed back to the material supply controlling system 204 of the material supply system, the manufacture controlling system 206 of the manufacturing system, the sales controlling system 208 of the sales system, the travel controlling system 22 and the node controlling system 122 of the physical distribution/transportation system (physical distribution controlling system of the physical distribution system when a physical distributor is further included) and the respective systems are carried out with the fed-back specifications. At step S107, the specifications which have been inputted to the integrated controlling system 202 at step S106 is reconfirmed and when there poses no problem, the operation proceeds to step S108 where the integrated physical distribution system is carried out with the determined specifications. Meanwhile, when there poses a problem in the inputted result, the operation returns to step S102 where the virtual program is carried out again.

In this way, the virtual program for simulating the flow of the integrated physical distribution system is provided, optimum conditions of production and so on can be selected by carrying out the program with the result that production, transportation etc. of products can be efficiently achieved.

Such an integrated physical distribution system can be part of a more complete integrated physical distribution system by linkage with support systems of JIT (Just in Time), CIM (Computer Integrated Manufacturing), CALS (Continuous Acquisition and Lifecycle Support), MRP (Material Requirement Planning), POS (Point of Sales), FA (Factory Automation) and so on.

The invention may be embodied in other specific forms without departing from the spirit or essential characteristics thereof. The present embodiments are therefore to be considered in all respects as illustrative and not restrictive. The scope of the invention being indicated by the appended claims rather than by the foregoing description and all changes which come within the meaning and the range of equivalency of the claims are therefore intended to be embraced therein.

As described above, the physical distribution/transportation system of the present invention is useful as a system of efficiently transporting cargoes of products, materials and so on by utilizing autonomous pallet vehicles. Further, the integrated physical distribution system of the invention is useful as a system for efficiently carrying out the total physical distribution including material suppliers, manufacturers and sellers and is provided as an integrated system including a material supply system, a manufacturing system and a sales system.

What is claimed is:

1. A physical distribution/transportation system comprising:

a plurality of nodes;

a dedicated traveling line for connecting the plurality of nodes;

pallet vehicles which travel between the plurality of nodes along the dedicated traveling line; and travel controlling means for controlling operation of the pallet vehicles between the plurality of nodes, the plurality of nodes including a specific node provided so as to correspond to a specific area, the specific node being provided with a dedicated traveling line connected thereto, for loading and unloading cargoes of the pallet vehicle, and an ordinary traveling line connected thereto, for the ordinary vehicle which at least one of collects a cargo from a delivery destination within a specific are and delivers a cargo to delivery destination within a specific area, the dedicated traveling line being arranged on one side of the specific node, the ordinary traveling line being arranged on the other side of the specific node opposed to the one side so as to be nearly parallel to the dedicated traveling line and move in a direction opposite to that of the dedicated traveling line, the travel controlling means controlling operation of the pallet vehicles which travel the dedicated traveling line, based on transporting party information and transported destination information regarding the delivery cargoes, wherein when a cargo is delivered from a shipment party of a first specific area to a delivery destination of a second specific area, the cargo is collected from the shipment party to a first specific node corresponding to the first specific area by an ordinary vehicle, transported by the pallet vehicle between the first specific node and a second specific node corresponding to the second specific area, and delivered by the ordinary vehicle from the second specific node to the delivery destination.

2. A physical distribution/transportation system, comprising:

a plurality of nodes including a first node corresponding to first area and a second node corresponding to a second area;

a dedicated traveling line to interconnect said first node and said second node, an ordinary traveling line associated with said first node;

at least one pallet vehicle arranged to travel along said dedicated traveling line between said first node and said second node, whereby a cargo is capable of being delivered from a shipping location within the first area to a receiving location within the second area; and a controller to control travel of said at least one pallet vehicle based upon cargo information of the shipping location and cargo information of the receiving location, such that when a cargo is to be delivered from the shipping location to the receiving location, the cargo is transported by an ordinary vehicle along said ordinary traveling line from the shipping location to said first node, then transported by said at least one pallet vehicle along said dedicated traveling line from said first node to said second node, and then transported by an ordinary vehicle from said second node to the receiving location, wherein said dedicated traveling line extends generally parallel to said ordinary traveling line, with said dedicated traveling line being arranged on a first side of said first node and said ordinary traveling line being arranged on an opposite second side of said first node, and wherein said controller is to control travel of said at least one pallet vehicle such that said at least one pallet vehicle travels from said first node to said second node in a direction that is one of generally opposite to and generally the same as the direction in which the ordinary vehicle travels along said ordinary traveling line from the shipping location to said first node.

3. The physical distribution/transportation system according to claim 2, wherein said at least one pallet vehicle includes structure for loading and securing a cargo, guidance structure to automatically control traveling of said at least one pallet vehicle along said dedicated traveling line, and a control system to automatically control said guidance structure such that said at least one pallet vehicle travels along said dedicated traveling line based upon information of the cargo.

4. The physical distribution/transportation system according to claim 3, wherein said first node comprises a first unloading dock to unload a cargo from a respective one of said at least one pallet vehicle, a first loading dock to load a cargo onto a respective one of said at least one pallet vehicle, a second unloading dock to unload a cargo from an ordinary vehicle, a second loading dock to load a cargo onto an ordinary vehicle, a first transfer apparatus to transfer a cargo from said first unloading dock to said second loading dock, and a second transfer apparatus to transfer a cargo from said second unloading dock to said first loading dock, wherein said first unloading dock, said first transfer apparatus and said second loading dock are arranged on a third side of said first node, and said second unloading dock, said second transfer apparatus and said first loading dock are arranged on an opposite fourth side of said first node, with said first and opposite second sides being generally perpendicular to said third and opposite fourth sides.

5. The physical distribution/transportation system according to claim 4, and further comprising a first storage yard to temporarily stock a cargo unloaded at said first unloading dock, a second storage yard to temporarily stock a cargo unloaded at said second unloading dock, a pallet vehicle storage yard to stock a plurality of said at least one pallet vehicle not loaded with cargoes, respectively, provided between said first unloading dock and said first loading dock, and a vehicle parking yard to park ordinary vehicles not loaded with cargoes, respectively, provided between said second unloading dock and said second loading dock.

6. The physical distribution/transportation system according to claim 2, wherein said plurality of nodes further includes a harbor node to of unload a cargo from a ship and load a cargo onto a ship, and wherein said controller is to control travel of said at least one pallet vehicle such that at least one of the following conditions is met:

(i) when a cargo unloaded from a ship at said harbor node is to be delivered to a receiving location, the cargo is transported by said at least one pallet vehicle along said dedicated traveling line to a node corresponding to an area containing the receiving location; and (ii) when a cargo delivered from a shipping location is to be loaded onto a ship at said harbor node, the cargo is transported by said at least one pallet vehicle along said dedicated traveling line from a node corresponding to an area containing the shipping location to said harbor node.

7. The physical distribution/transportation system according to claim 6, and further comprising a crane to unload a cargo from a ship and then deposit the cargo directly onto said at least one pallet vehicle, and also to load a cargo directly onto a ship from said at least one pallet vehicle, and also further comprising an area at or near said harbor node where said at least one pallet vehicle is to at least one of travel at a low speed and temporarily stop.

8. The physical distribution/transportation system according to claim 2, wherein said plurality of nodes further includes a harbor pallet vehicle node to load said at least one pallet vehicle loaded with cargo onto a ship and unload said at least one pallet vehicle loaded with cargo from a ship, wherein said harbor pallet vehicle node includes part of said dedicated traveling line to be connected with part of a dedicated traveling line carried by the ship, and wherein said controller is to control travel of said at least one pallet vehicle along the connected dedicated traveling lines such that said at least one pallet vehicle is at least one of directly loaded onto the ship and directly unloaded from the ship.

9. The physical distribution/transportation system according to claim 2, wherein said plurality of nodes further includes an airport node to unload cargo from an airplane and load cargo onto an airplane, and wherein said controller is to control travel of said at least one pallet vehicle such that at least one of the following conditions is met:

(i) when a cargo unloaded from an airplane at said airport node is to be delivered to a receiving location, the cargo is transported by said at least one pallet vehicle along said dedicated traveling line to a node corresponding to an area containing the receiving location; and (ii) when a cargo delivered from a shipping location is to be loaded onto an airplane at said airport node, the cargo is transported by said at least one pallet vehicle along said dedicated traveling line from a node corresponding to an area containing the shipping location to said airport node.

10. The physical distribution/transportation system according to claim 9, and further comprising a crane to unload a cargo from an airplane and then deposit the cargo directly onto said at least one pallet vehicle, and also to load a cargo directly onto an airplane from said at least one pallet vehicle, and also further comprising an area at or near said airport node where said at least one pallet vehicle is to at least one of travel at a low speed and temporarily stop.

11. The physical distribution/transportation system according to claim 2, wherein said plurality of nodes further includes an airport pallet vehicle node to load said at least one pallet vehicle loaded with cargo onto an airplane and unload said at least one pallet vehicle loaded with cargo from an airplane, wherein said airport pallet vehicle node includes part of said dedicated traveling line to be connected with part of a dedicated traveling line carried by the airplane, and wherein said controller is to control travel of said at least one pallet vehicle along the connected dedicated traveling lines such that said at least one pallet vehicle is at least one of directly loaded onto the airplane and directly unloaded from the airplane.

12. The physical distribution/transportation system according to claim 2, wherein said plurality of nodes includes an offshore node provided at an offshore area remote from an inland area, with said offshore node and the inland area to be connected by one of a bridge and tunnel provided with a dedicated traveling line.

13. The physical distribution/transportation system according to claim 2, and further comprising at least one container to be transported by said at least one pallet vehicle, wherein said at least one container is to contain a cargo of a plurality of items.

14. The physical distribution/transportation system according to claim 13, wherein said at least one container includes a first container and a second container, and further comprising a reloading yard located at each of said plurality of nodes to remove items from said first container and load the items into said second container.

15. The physical distribution/transportation system according to claim 2, wherein the cargo includes containers containing a plurality of items, and further comprising a reloading yard located at each of said plurality of nodes to remove items from one of the containers and load the items into another of the containers.

* * * * *